United States Patent
Kurokawa

(10) Patent No.: US 7,173,654 B2
(45) Date of Patent: Feb. 6, 2007

(54) DIGITAL CAMERA HAVING COLOR ADJUSTMENT CAPABILITY

(75) Inventor: Mitsuaki Kurokawa, Osaka (JP)

(73) Assignee: Sanyo Electric Co., Ltd., Osaka (JP)

(*) Notice: Subject to any disclaimer, the term of this patent is extended or adjusted under 35 U.S.C. 154(b) by 675 days.

(21) Appl. No.: 10/171,634

(22) Filed: Jun. 17, 2002

(65) Prior Publication Data

US 2002/0191084 A1    Dec. 19, 2002

(30) Foreign Application Priority Data

Jun. 19, 2001 (JP) ............................. 2001-184650

(51) Int. Cl.
*H04N 9/73* (2006.01)
(52) U.S. Cl. .............................. 348/223.1; 348/333.02
(58) Field of Classification Search ............. 348/223.1
See application file for complete search history.

(56) References Cited

U.S. PATENT DOCUMENTS

| 6,072,526 A * | 6/2000 | Hashimoto et al. ....... 348/223.1 |
| 2002/0008762 A1* | 1/2002 | Takemoto ................... 348/223 |
| 2002/0080251 A1* | 6/2002 | Moriwaki ................... 348/232 |
| 2004/0090527 A1* | 5/2004 | Kanevsky et al. ....... 348/207.1 |
| 2004/0227823 A1* | 11/2004 | Shimizu .................. 348/223.1 |

FOREIGN PATENT DOCUMENTS

CN    1213925 A    12/2004

* cited by examiner

*Primary Examiner*—Ngoc-Yen Vu
*Assistant Examiner*—Anthony J. Daniels
(74) *Attorney, Agent, or Firm*—Westerman, Hattori, Daniels & Adrian, LLP.

(57) ABSTRACT

A digital camera includes a CCD imager. Image data of an object photographed by the CCD imager is subjected to a color adjustment based on a plurality of first color adjustment values which correspond to a plurality of representative colors and a plurality of second color adjustment values which correspond to a plurality of non-representative colors. If a desired representative color is selected and a dial key is operated, the first color adjustment value of the desired representative color, that is, a desired first color adjustment value is changed. In addition, a specific first color adjustment value adjacent to the desired first color adjustment value in a hue direction, a specific second color adjustment value sandwiched by the desired first color adjustment value and the specific first color adjustment value with regard to a hue, and a first change amount of the desired first color adjustment value by a key operation are detected, and a second change amount of the specific second color adjustment value is calculated by a linear approximation. The specific second color adjustment value is changed in accordance with the calculated second change amount.

19 Claims, 21 Drawing Sheets

FIG. 3 22h

| N | REFERENCE H COMPONENT VALUE (H:HUE) | REFERENCE C COMPONENT VALUE (C:CHROMA) | REFERENCE L COMPONENT VALUE (L:LUMINANCE) |
|---|---|---|---|
| 0 | 23 | 600 | 104.956 |
| 1 | 48 | 580 | 184.515 |
| 2 | 75 | 600 | 147.577 |
| 3 | 115 | 580 | 121.845 |
| 4 | 135 | 630 | 162.774 |
| 5 | 170 | 610 | 184.893 |
| 6 | 187 | 600 | 166.518 |
| 7 | 232 | 610 | 126.177 |
| 8 | 250 | 640 | 153.17 |
| 9 | 275 | 600 | 94.075 |
| 10 | 305 | 560 | 190.223 |
| 11 | 338 | 610 | 187.512 |

FIG. 4
22i~22k

| N | TARGET H COMPONENT VALUE (H:HUE) | TARGET C COMPONENT VALUE (C:CHROMA) | TARGET L COMPONENT VALUE (L:LUMINANCE) |
|---|---|---|---|
| 0 | 21 | 730 | 88.006 |
| 1 | 55 | 700 | 184.154 |
| 2 | 78 | 730 | 119.846 |
| 3 | 120 | 720 | 96.69 |
| 4 | 138 | 750 | 142.925 |
| 5 | 172 | 740 | 160.774 |
| 6 | 186 | 730 | 167.763 |
| 7 | 230 | 740 | 84.193 |
| 8 | 253 | 760 | 144.961 |
| 9 | 280 | 740 | 73.102 |
| 10 | 307 | 680 | 185.965 |
| 11 | 340 | 710 | 189.011 |

DIGITAL CAMERA HAVING COLOR ADJUSTMENT CAPABILITY

BACKGROUND OF THE INVENTION

1. Field of the Invention

The present invention relates to a digital camera. More specifically, the present invention relates to a digital camera which subjects an image signal of an object photographed by a photographing means to a color adjustment based on a plurality of first color adjustment values and at least one second color adjustment value.

2. Description of the Prior Art

A color reproduction characteristic of an image photographed by a digital camera is determined by what kind of signal processings are subjected to an image signal outputted from an image sensor. Accordingly, a signal processing technology serves as an important element in improving the color reproduction characteristic of the photographed image. However, in a conventional digital camera, the color adjustment applied to the photographed image under various circumstances was difficult to perform, and there was a tendency that the color adjustment is of suitable for an object photographed in a good condition. In addition, it was not possible to change a setting of the color adjustment value on the camera, and it was necessary to transfer the photographed image signal to a personal computer in performing the color adjustment. Whilst it becomes possible to carry out a color tone correction on the digital camera if a color tone correction software to be mounted on the personal computer is mounted on the digital camera, it is difficult to secure a comfortable operability even if the color tone correction software for personal computer is applied as it is to the digital camera because there is a limit regarding a size of a monitor and the number of operation keys in a portable digital camera.

SUMMARY OF THE INVENTION

Therefore, it is a primary object of the present invention to provide a novel digital camera.

Therefore, it is another object of the present invention to provide a digital camera capable of improving operability of a color adjustment.

According to the present invention, a digital camera provided with a color adjuster which subjects an image signal of an object photographed by a photographer to a color adjustment based on a plurality of first color adjusting values and at least one second color adjusting value, comprises: an inputter for inputting a change instruction of a desired first color adjusting value out of the plurality of first color adjusting values; a first changer for changing the desired first color adjusting value in response to the change instruction; and a second changer for changing the second color adjusting value based on a first change amount of the desired first color adjusting value.

The color adjustment toward the image signal of the object photographed by the photographer is performed by the color adjustor based on the plurality of first color adjusting values and at least one second color adjusting value. If a change instruction of a desired first color adjusting value out of the plurality of first color adjusting values is inputted by the inputter; the desired first color adjusting value is changed by the first changer. The second color adjusting value is changed by the second changer based on a first change amount of the desired first color adjusting value. That is, if a change instruction of the desired first color adjusting value is applied, not only the desired first color adjusting value but also the second color adjusting value is changed. Therefore, even there is a limit ragarding a size of a monitor or the number of operation keys, and in addition, if an operator does not possess a thorough knowledge, it becomes possible to make an appropriate color adjustment. That is, operability at a time of the color adjustment in a portable digital camera is further improved.

Preferably, the plurality of first color adjusting values respectively correspond to at least one of the representative colors of a primary color system and a complementary color system. Since the representative color of the primary color system and the complementary color system have more popularity than those colors, the operability is further enhanced by making it possible to input the change instruction with respect to such the representative color.

An inputting operation of the change instruction becomes easy if an accepting screen which only accepts a change of the plurality of first color adjusting values out of the plurality of first color adjusting values and the second color adjusting value is to be displayed.

If a color sample in accordance with at least the desired first color adjusting value is to be included on the accepting screen, a color shade of the color sample changes in response to the change instruction. Accordingly, it becomes possible to make a visual color adjustment.

Furthermore, if the normalized first color adjusting value is to be included on the accepting screen, it becomes possible to make an easy and exact color adjustment.

If the color adjustment is carried out toward the image signal outputted from the photographer in a real time, and an image based on the image signal subjected to the color adjustment is to be displayed in a real time, the color tone of the display image also changes in response to the change instruction. Accordingly, it is possible to easily comprehend how the color tone of the photographed image changes, thus further improving the operability.

Preferably, each of the first color adjusting value and the second color adjusting value includes a hue as a parameter. The second changer seeks a second change amount of the specific color adjusting value based on a specific first color adjusting value adjacent to the desired first color adjusting value in a hue direction, a specific second color adjusting value sandwiched by the desired first color adjusting value and the specific first color adjusting value with respect to the hue, and a first change amount of the desired first color adjusting value. Then, the second color adjusting value is changed in accordance with the sought second change amount.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a reference value table;

FIG. 4 is an illustrative view showing a target value table;

DETAILED DESCRIPTION OF THE PREFERRED EMBODIMENTS

Figure 1:
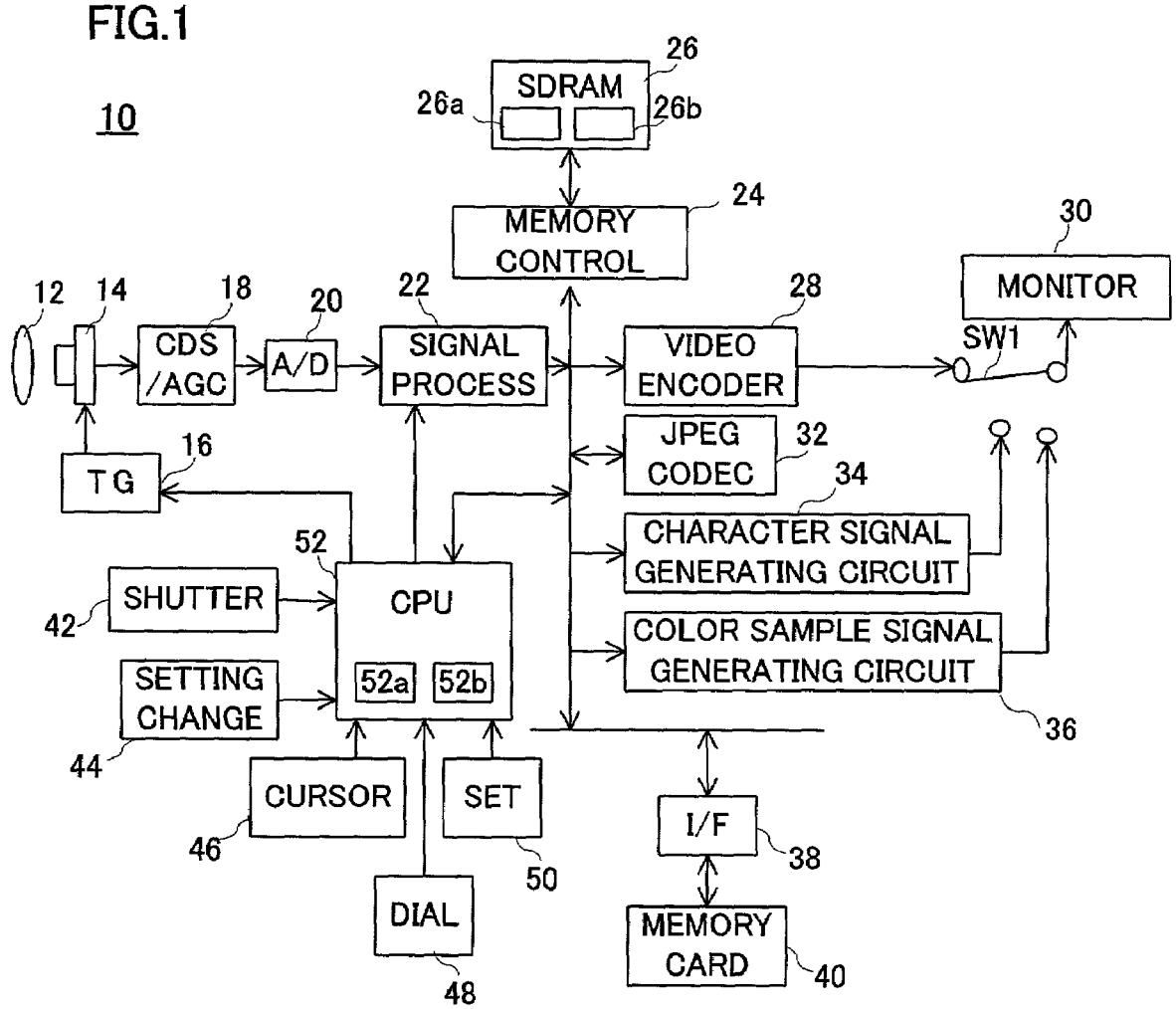
FIG. 1 is a block diagram showing one embodiment of the present invention.

Referring to FIG. 1, a digital camera 10 of this embodiment is a portable digital camera intended for an ordinary consumer. An optical image of an object is incident on a light-receiving-surface of a CCD imager 14 via a focus lens 12. On the light-receiving surface, a camera signal (raw image signal) corresponding to the incident optical image is generated by a photoelectric conversion. It is noted that the light-receiving surface is covered by a color filter of the Bayer pattern (not represented), and each of pixel signals forming the camera signal has only one color component of any R, G or B.

When a power is inputted, a processing instruction is applied to a timing generator (TG) 16 from a CPU 52, whereby the CCD imager 14 is driven by the TG 16. The CCD imager 14 repeats reading out the camera signal generated by the photoelectric conversion at a predetermined frame rate. The read camera signal of each frame is converted into a digital signal by an A/D converter 20 via a well-known noise removal and a level adjustment in a CDS/AGC circuit 18.

In response to the processing instruction from the CPU 52, a signal processing circuit 22 subjects the camera data of each frame outputted from the A/D converter 20 to signal processings such as color separation, white balance adjustment, color adjustment (color tone correction), YUV conversion, etc., so as to generate image data formed of a luminance component (Y data) and color difference components (U data, V data). The generated image data is applied to a memory control circuit 24, and written into an image data storing area 26a of an SDRAM 26 by the memory control circuit 24.

A video encoder 28 instructs the memory control circuit 24 to read out the image data stored in the image data storing area 26a corresponding to the processing instruction from the CPU 52. The video encoder 28 also encodes the read image data of each frame into a composite video signal according to an NTSC format, and supplies the encoded composite video signal to a monitor 30 via a switch SW1. Therefore, a real-time moving image of the object (a through image) is displayed on the monitor 30.

It is noted that the switch SW1 is connected to a character signal generating circuit 34 when a character signal is outputted from the character signal generating circuit 34, and connected to a color sample signal generating circuit 36 when a color sample signal is outputted from the color sample signal generating circuit 36. The character signal or the color sample signal is applied to the monitor 30 via the switch SW1, thereby a desired character or a desired color sample is OSD-displayed on the screen.

If a shutter button 42 is depressed by an operator, the CPU 52 applies a compression instruction to a JPEG CODEC 32. The JPEG CODEC 32 instructs the memory control circuit 24 to read out one frame of the image data stored in the image data storing area 26a, and subjects the read image data to a compression process in accordance with a JPEG format. In obtaining the compressed image data, the JPEG CODEC 32 applies the generated compressed image data to the memory control circuit 24. The compressed image data is stored in a compressed data storing area 26b by the memory control circuit 24.

Upon completing the storing process of the compressed image data, the CPU 52 reads out the compressed image data from the compressed data storing area 26b through the memory control circuit 24, and records the read compressed image data into a memory card 40 through an I/F circuit 38, thereby an image file is generated in the memory card 40. It is noted that the memory card 40 is a detachable non-volatile recording medium and becomes accessible by the CPU 52 when attached to a slot (not shown).

Figure 2:
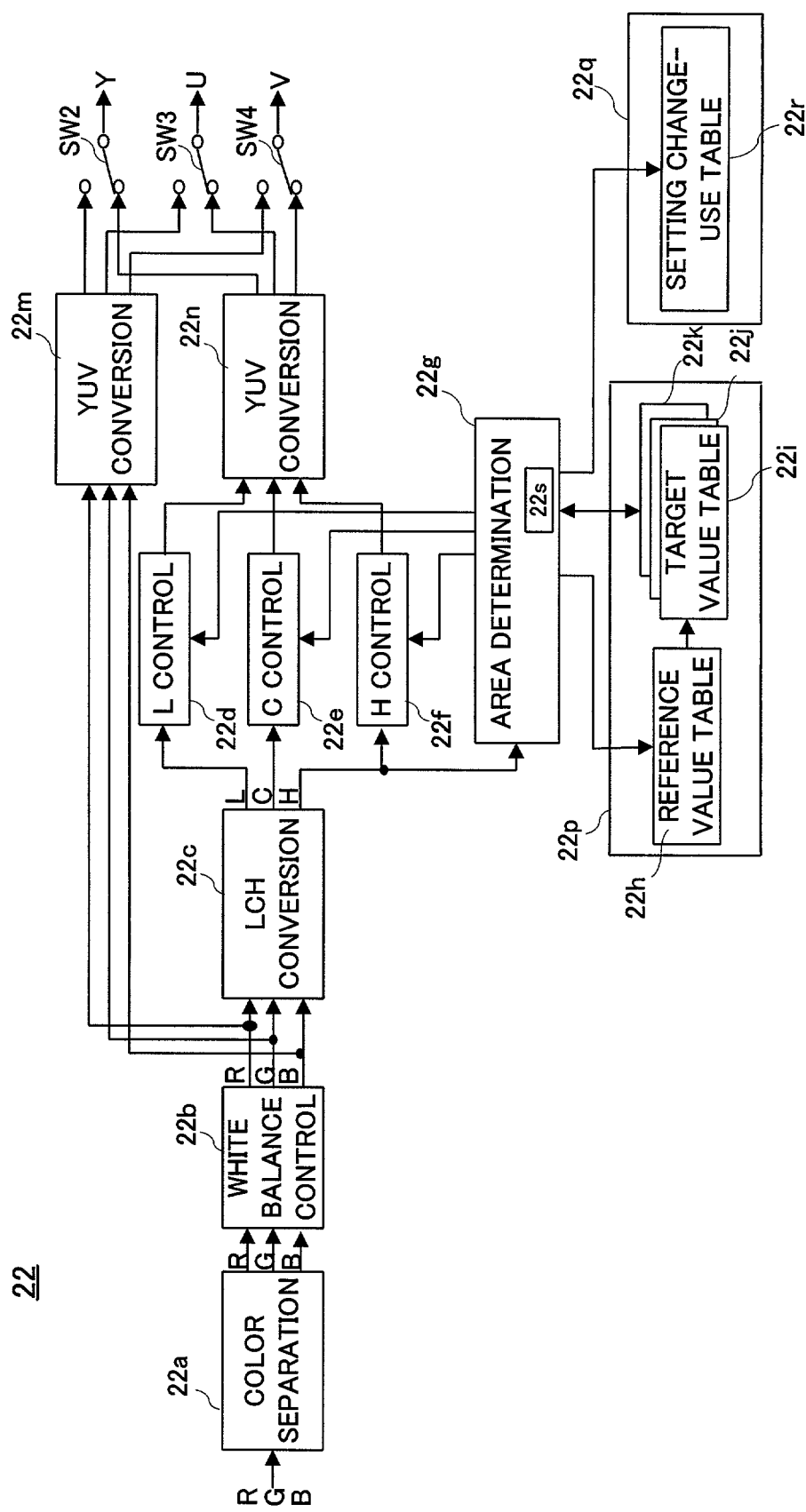
FIG. 2 is a block diagram showing one example of a signal processing circuit.

The signal processing circuit 22 is constituted as shown in FIG. 2. The camera data outputted from the A/D converter 20 is subjected to the color separation by a color separation circuit 22a. That is, since each of pixel data forming the camera data has no more than any one of the R component, the G component, and the B component, the two color components lacking in each pixel are supplemented by the color separation circuit 22a. The R component, the G component, and the B component forming each pixel are simultaneously outputted from the color separation circuit 22a. The R component, the G component, and the B component outputted one pixel by one pixel are applied to an LCH conversion circuit 22c via a white balance adjusting circuit 22b, and converted into an L component (luminance component), a C component (chroma component), and an H component (hue component).

The converted L component, the C component, and the H component are respectively applied to an L adjusting circuit

22*d*, a C adjusting circuit 22*e*, and an H adjusting circuit 22*f*. The L adjusting circuit 22*d*, the C adjusting circuit 22*e*, and the H adjusting circuit 22*f* respectively subject the inputted L component, the C component, and the H component to predetermined operations so as to evaluate a corrected L component, a corrected C component, and a corrected H component. The corrected L component, the corrected C component, and the corrected H component are then converted into a Y component, a U component, and a V component by a YUV conversion circuit 22*n* later, and the converted Y component, the U component, and the V component are respectively outputted via switches SW2, SW3, and SW4. Herein, the YUV conversion circuit 22*n* performs a so-called 4:2:2 conversion (or 4:1:1 conversion), and each of the Y component, the U component, and the V component outputted from the switches SW2–SW4 has a 4:2:2 (or 4:1:1) ratio.

It is noted that the switches SW2–SW4 are connected to a YUV conversion circuit 22*m* only when a predetermined instruction is outputted from an inspecting apparatus in an inspecting process. At this time, the Y component, the U component, and the V component generated in the YUV conversion circuit 22*m* based on the R component, the G component, and the B component outputted from the white balance adjusting circuit 22*b* are outputted via the switches SW2–SW4. The YUV conversion circuit 22*m* also subjects a so-called 4:2:2 conversion (or 4:1:1 conversion), and the Y component, the U component, and the V component are outputted at a 4:2:2 (or 4:1:1) ratio from the switches SW1–SW3.

The H component outputted from the LCH conversion circuit 22*c* is also applied to an area determining circuit 22*g*. The area determining circuit 22*g* determines an area to which the H component applied from the LCH conversion circuit 22*c* belongs by referring to a reference value table 22*h*. The area determining circuit 22*g* also reads out two reference values corresponding to a determination result from the reference value table 22*h*, and reads out two target values corresponding to the determination result from any one of target value tables 22*i*~22*k*, or a setting change-use table 22*r*. The predetermined operation by the L adjusting circuit 22*d*, the C adjusting circuit 22*e*, and the H adjusting circuit 22*f* is carried out based on the read reference value and the target value.

Figure 5:
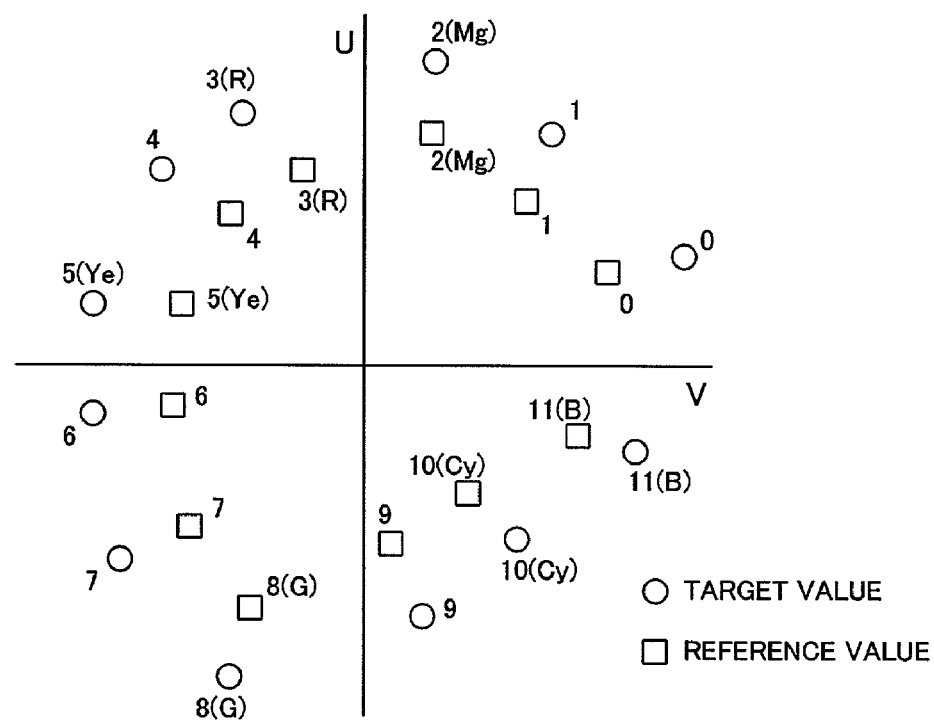
FIG. 5 is an illustrative view showing one example of a distribution state of reference values and target values.
Figure 6:
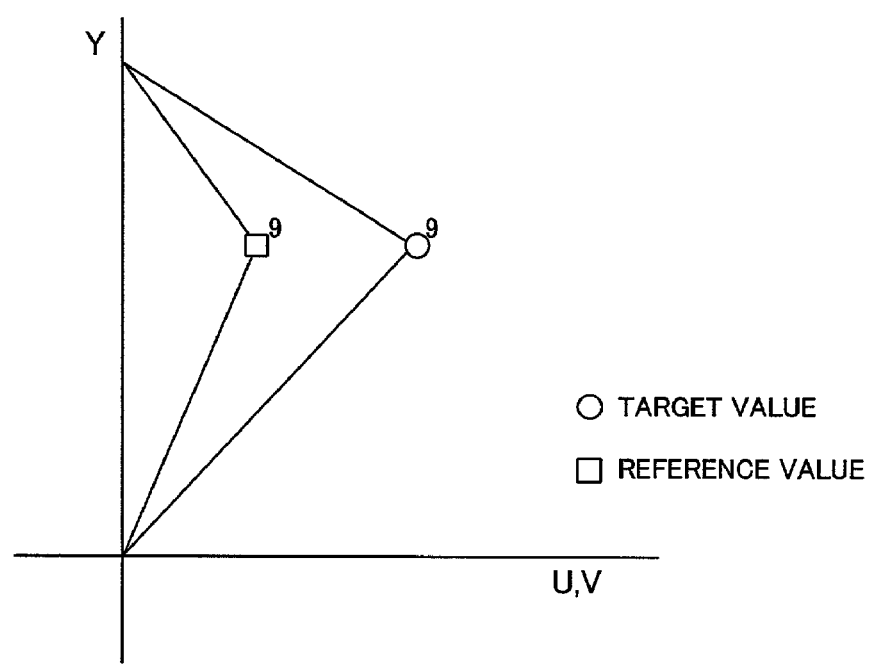
FIG. 6 is a an illustrative view showing one example of a distribution state of a reference value and a target value.

Referring to FIG. 3, 12 reference H component values, 12 reference C component values, and 12 reference L component values are written on the reference value table 22*h*. H, C, and L respectively mean hue, chroma, and luminance, and each of which is a parameter for a color adjustment. The same reference value number N (0~11) is assigned to the reference H component value, the reference C component value, and the reference L component value associated with each other, and the reference value is defined by three component values (the reference H component value, the reference C component value, and the reference L component value) having the common reference number. These 12 reference values are distributed in a YUV space as shown in FIG. 5 and FIG. 6. It is noted that only the reference value having "5" as the reference number is shown in FIG. 6.

On the other hand, each of the target value tables 22*i*~22*k* is formed as shown in FIG. 4. Similar to the reference value table 22*h* shown in FIG. 3, 12 target H component values, 12 target C component values, and 12 target L component values respectively associated with the hue (H), the chroma (C), and the luminance (L) are set, and the target value is defined by the target H component values, the target C component values, and the target L component value assigned with the same target value number N (=0 to 11). When the target H component values, the target C component values, and the target L component values indicate numerical values shown in FIG. 4, the 12 target values are distributed in the YUV space as shown in FIG. 5 and FIG. 6. It is noted that only the target value having "5" as the reference value number is shown in FIG. 6.

As understood from FIG. 5, the reference value and the target value of N=2 correspond to "Mg", the reference value and the target value of N=3 correspond to "R", the reference value and the target value of N=5 correspond to "Ye", the reference value and the target value of N=8 correspond to "G", the reference value and the target value of N=10 correspond to "Cy", and the reference value and the target value of N=11 correspond to "B". In addition, the reference values and the target values of N=0,1,4,6,7 or 9 correspond to a color other than the colors described above. That is, a part of the reference values and the target values respectively correspond to a representative color in a primary color system or in a complementary color system, and the remaining reference values and target values respectively correspond to a non-representative color different from such the representative colors.

The target value tables 22*i*~22*k* are different from the reference value table 22*h* in that the target value which corresponds to the representative color can be changed. That is, while the reference H component values, the reference C component values, and the reference L component values stored in the reference value table 22*h* are previously fixed in a manufacturing process, and not freely changed by the operator, the reference H component values, the reference C component values, and the reference L component values of N=2, 3, 5, 8, 10 or 11 stored in the target value tables 22*i*~22*k* can be arbitrarily changed by the operator.

It is noted that the target H component value and the target C component value which correspond to the representative color are, in particular, defined as a first color adjusting value, and the target H component value and the target C component value which correspond to the non-representative color are, in particular, defined as a second color adjusting value in this embodiment.

When any one of the target value tables 22*i*~22*k* is selected for changing the target values, the target values set on the selected target value table are copied on the setting change-use table 22*r*. If a changing operation of a target value corresponding to the representative color is performed, the target value is changed, and in addition, other target values of the non-representative color are changed by a linear approximation. Such the change of the target values is carried out on the setting change-use table 22*r*.

At the time of the changing operation, the area determination circuit 22*g* carries out an area determination and a selection of the reference values and the target values corresponding to the determination result by referring to the reference value table 22*h* and the setting change-use table 22*r*. Upon completing the changing operation, the target values stored on the setting change-use table 22*r* are returned to the target value table of a reading source. The table used for the area determination is also returned to the target value table of the reading source from the setting change-use table 22*r*.

It is noted that the reference value table 22*h* and the target value tables 22*i*~22*k* are stored in a non-volatile memory 22*p*, and the setting change-use table 22*r* is stored in a volatile memory 22*q*. Furthermore, the target value tables 22*i*~22*k* correspond to modes 1~3, respectively.

Figure 7:
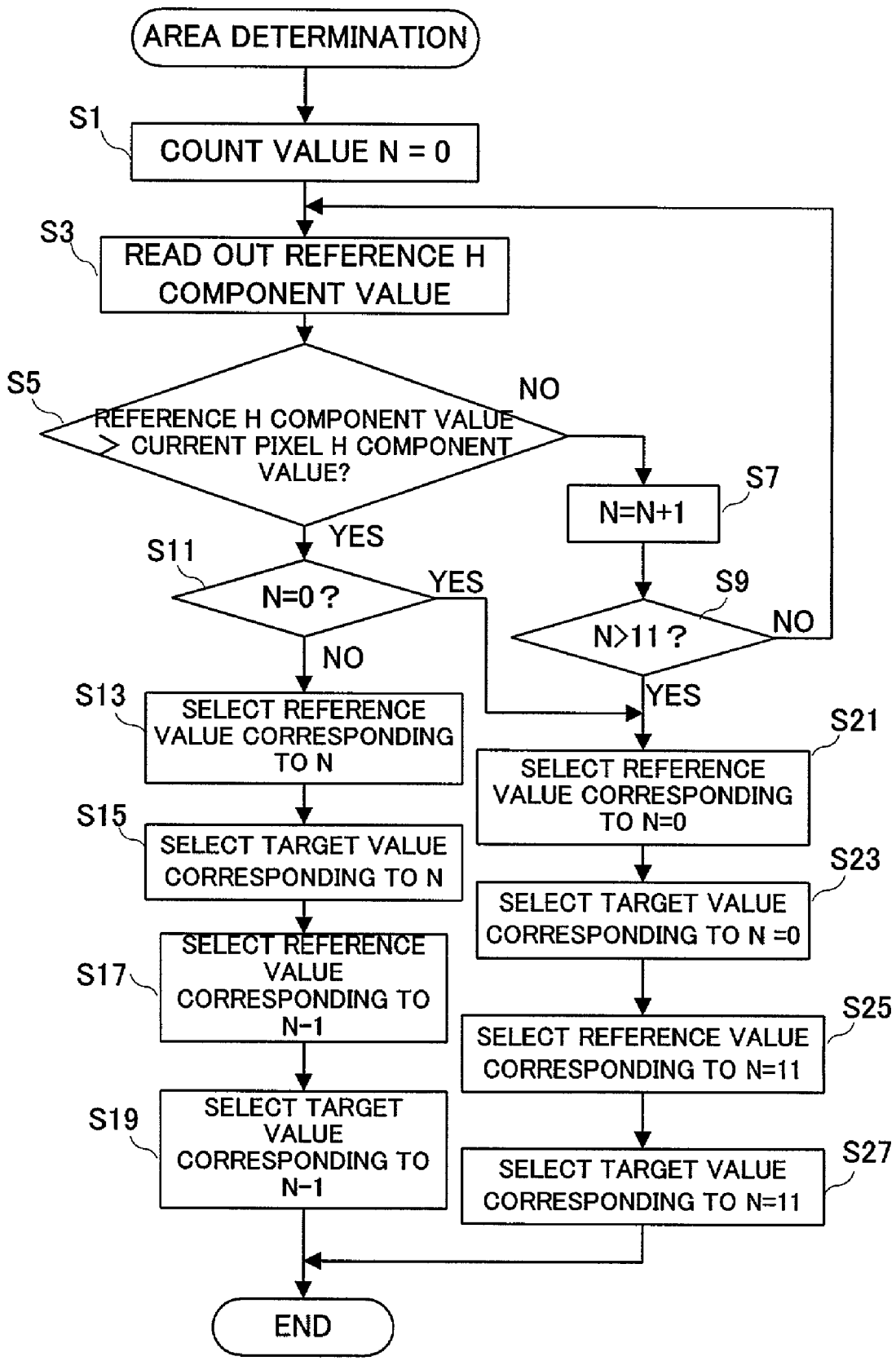
FIG. 7 is a flowchart showing a portion of an operation of an area determining circuit.

The area determining circuit 22g executes a process according to a flowchart shown in FIG. 7 one pixel by one pixel so as to carry out an area determination for each pixel forming the image data and a selection of reference values and target values corresponding to the determination result. Firstly, a count value N of a counter 22s is set to "0" in a step S1, and the reference H component value corresponding to the count value N is read out from the reference value table 22h in a step S3. In a step S5, the H component value of a current pixel inputted from the LCH conversion circuit 22 (current pixel H component value) is compared with the reference H component value read out from the reference value table 22h.

If it is determined that the reference H component value is greater than (>) the current pixel H component value in the step S5, the count value N is compared with "0" in a step S11. Herein, if N is equal to (=)0, steps S21~S27 are carried out. However, if N is greater than (>)1, steps S13–S19 are carried out. On the other hand, if the reference H component value is equal to or less than (≦) the current pixel H component value, the counter 22s is incremented in a step S7, and the renewed count value N is compared with "11" in a subsequent step S9. Then, if N is equal to or less than (≦)11, the process returns to the step S3. However, if N is greater than (>)11, then the steps S21~S27 are processed.

The reference H component value, the reference C component value, and the reference L component value which correspond to the current count value N are selected as Hr1, Cr1, and Lr1 from the reference value table 22h in the step S13, and the target H component values, the target C component values, and the target L component value which correspond to the current count value N are selected as Ht1, Ct1, and Lt1 from any one of either the target value tables 22i~22k and the setting change-use table 22r in the step S15. Furthermore, the reference H component value, the reference C component value, and the reference L component value which correspond to the count value N−1 are selected as Hr2, Cr2, and Lr2 from the reference value table 22h in the step S17, and the target H component values, the target C component values, and the target L component value which correspond to the count value N−1 are selected as Ht2, Ct2, and Lt2 from any one of the target value tables 22i~22k and the setting change-use table 22r in the step S19.

On the other hand, the reference H component value, the reference C component value, and the reference L component value which correspond to the count value N=0 are selected as Hr1, Cr1, and Lr1 from the reference value table 22h in the step S21, and the target H component values, the target C component values, and the target L component value which correspond to the count value N=0 are selected as Ht1, Ct1, and Lt1 from any one of the target value tables 22i~22k and the setting change-use table 22r in the step S23. Furthermore, the reference H component value, the reference C component value, and the reference L component value which correspond to the count value N=11 are selected as Hr2, Cr2, and Lr2 from the reference value table 22h in the step S25, and the target H component values, the target C component values, and the target L component value which correspond to the count value N=11 are selected as Ht2, Ct2, and Lt2 from any one of the target value tables 22i~22k and the setting change-use table 22r in the step S27.

Thus, two reference values which sandwich the current pixel value with respect to a hue and two target values corresponding to the two reference values are detected. It is noted that a reading source of the target values in steps S15, S19, S23, and S27 are the same with each other.

The reference H component values Hr1 and Hr2 and the target H component values Ht1 and Ht2 are applied to the H adjusting circuit 22f. Furthermore, the reference C component values Cr1 and Cr2 and the target C component values Ct1 and Ct2 are applied to the C adjusting circuit 22e. Moreover, the reference L component values Lr1 and Lr2 and the target L component values Lt1 and Lt2 are applied to the L adjusting circuit 22d.

Figure 8:
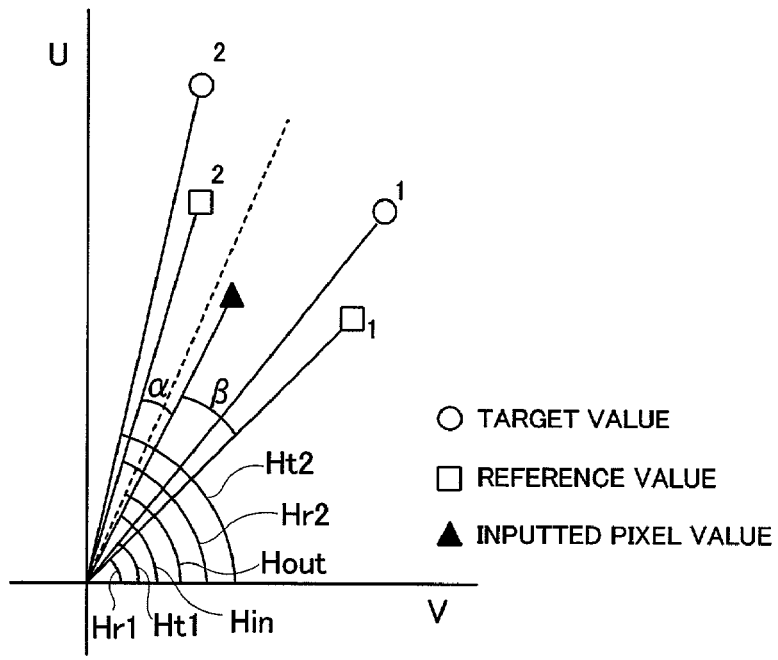
FIG. 8 is an illustrative view showing a portion of an operation of the FIG. 1 embodiment.

The H adjusting circuit 22f fetches a current pixel H component value Hin from the LCH conversion circuit 22c, and calculates a corrected H component value Hout in accordance with an Equation 1. The calculated corrected H component value Hout is shifted to an angle indicated by a dotted line in FIG. 8.

$$Hout = (Ht2 \cdot \beta + Ht1 \cdot \alpha)/(\alpha + \beta) \qquad \text{(Equation 1)}$$

$$\alpha = |Hr2 - Hin|$$

$$\beta = |Hr1 - Hin|$$

In addition, the H adjusting circuit 22f outputs angle data $\alpha$ (=|Hr2−Hin|) and $\beta$ (=|Hr1−Hin|) to the C adjusting circuit 22e and the L adjusting circuit 22d and also outputs angle data $\gamma$ (=|Ht2−Hout|) and $\delta$ (=|Ht1−Hout|) to the L adjusting circuit 22d.

Figure 9:
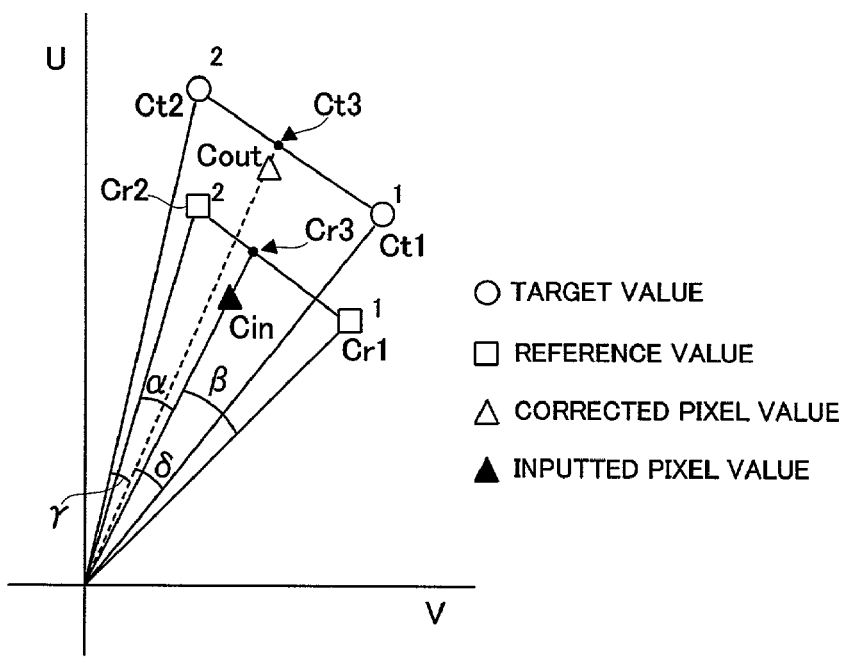
FIG. 9 is an illustrative view showing another portion of the operation of the FIG. 1 embodiment.

The C adjusting circuit 22e subjects a current pixel C component value Cin fetched from the LCH conversion circuit 22c to an operation shown in an Equation 2, and calculates a corrected C component value Cout shown in FIG. 9.

$$Cout = Cin \cdot \{Ct1 + (Ct2 - Ct1) \cdot \beta/(\alpha + \beta)\} / \{Cr1 + (Cr2 - Cr1) \cdot \beta/(\alpha + \beta)\} \qquad \text{(Equation 2)}$$

Furthermore, the C adjusting circuit 22e performs a calculation of an Equation 3 so as to seek a C component value Cr3 at intersecting coordinates of a straight line connecting CH system coordinates (0, 0) and (Cin, Hin) and a straight line connecting CH system coordinates (Cr1, Hr1) and (Cr2, Hr2), and a C component value Ct3 at intersecting coordinates of a straight line connecting CH system coordinates (0, 0) and (Cout, Hout) and a straight line connecting CH system coordinates (Ct1, Ht1) and (Ct2, Ht2). Then, the calculated C component value Cr3 and the Ct3 are outputted to the L adjusting circuit 22d along with the aforementioned current pixel C component value Cin and the corrected C component value Cout.

$$Cr3 = Cr1 + (Cr2 - Cr1) \cdot \beta/(\alpha + \beta) \qquad \text{(Equation 3)}$$

$$Ct3 = Ct1 + (Ct2 - Ct1) \cdot \delta/(\gamma + \delta)$$

Figure 10:
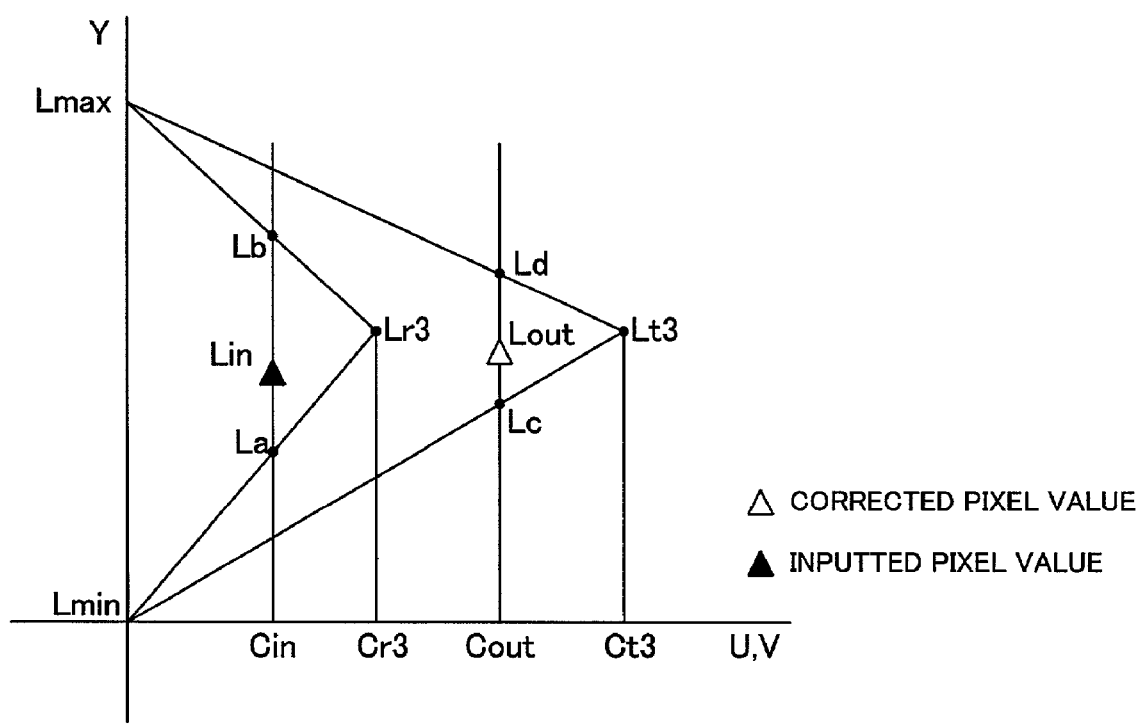
FIG. 10 is an illustrative view showing the other portion of the operation of the FIG. 1 embodiment.
Figure 11:
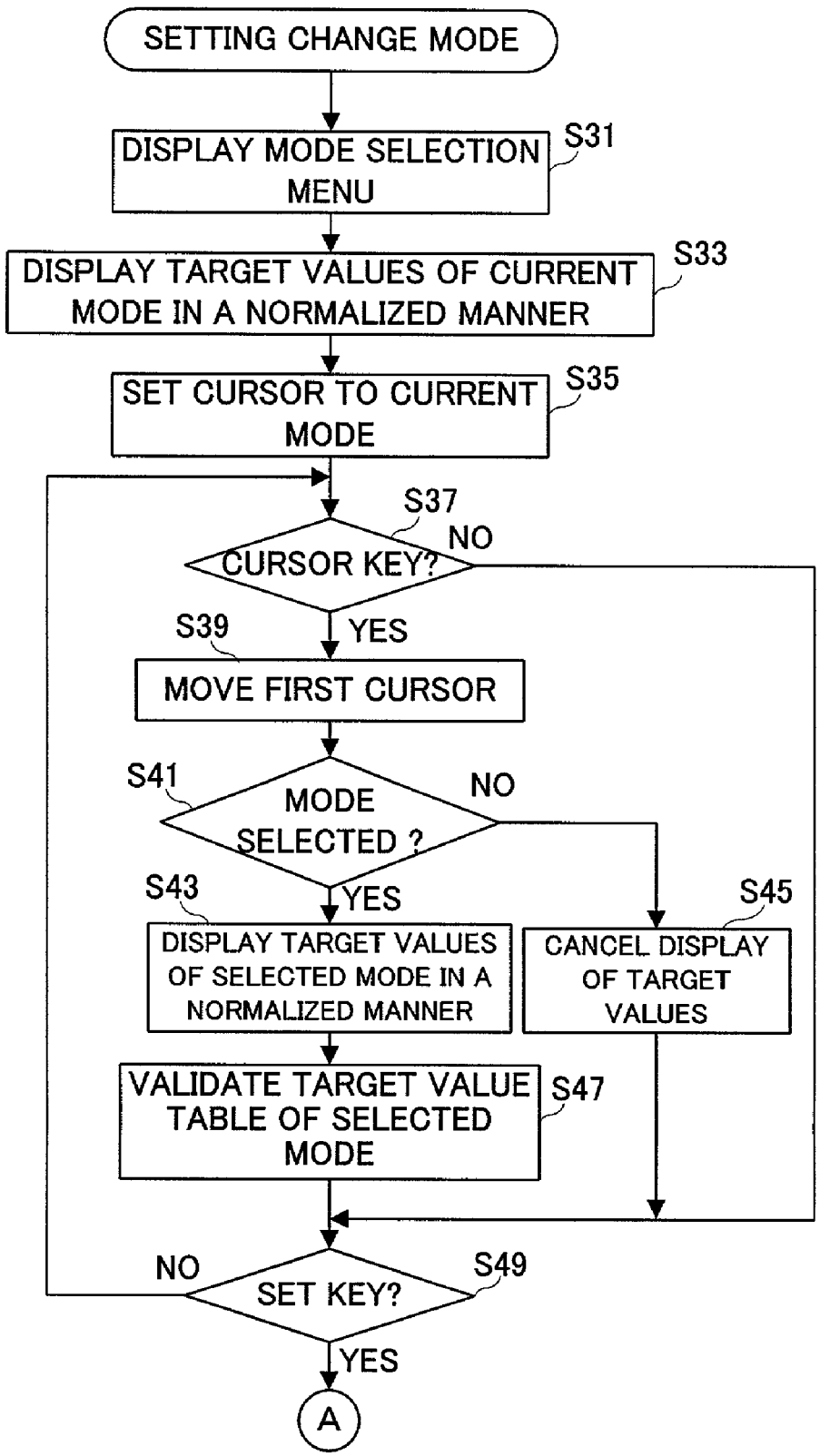
FIG. 11 is a flowchart showing a portion of an operation of a CPU in a setting change mode.
Figure 12:
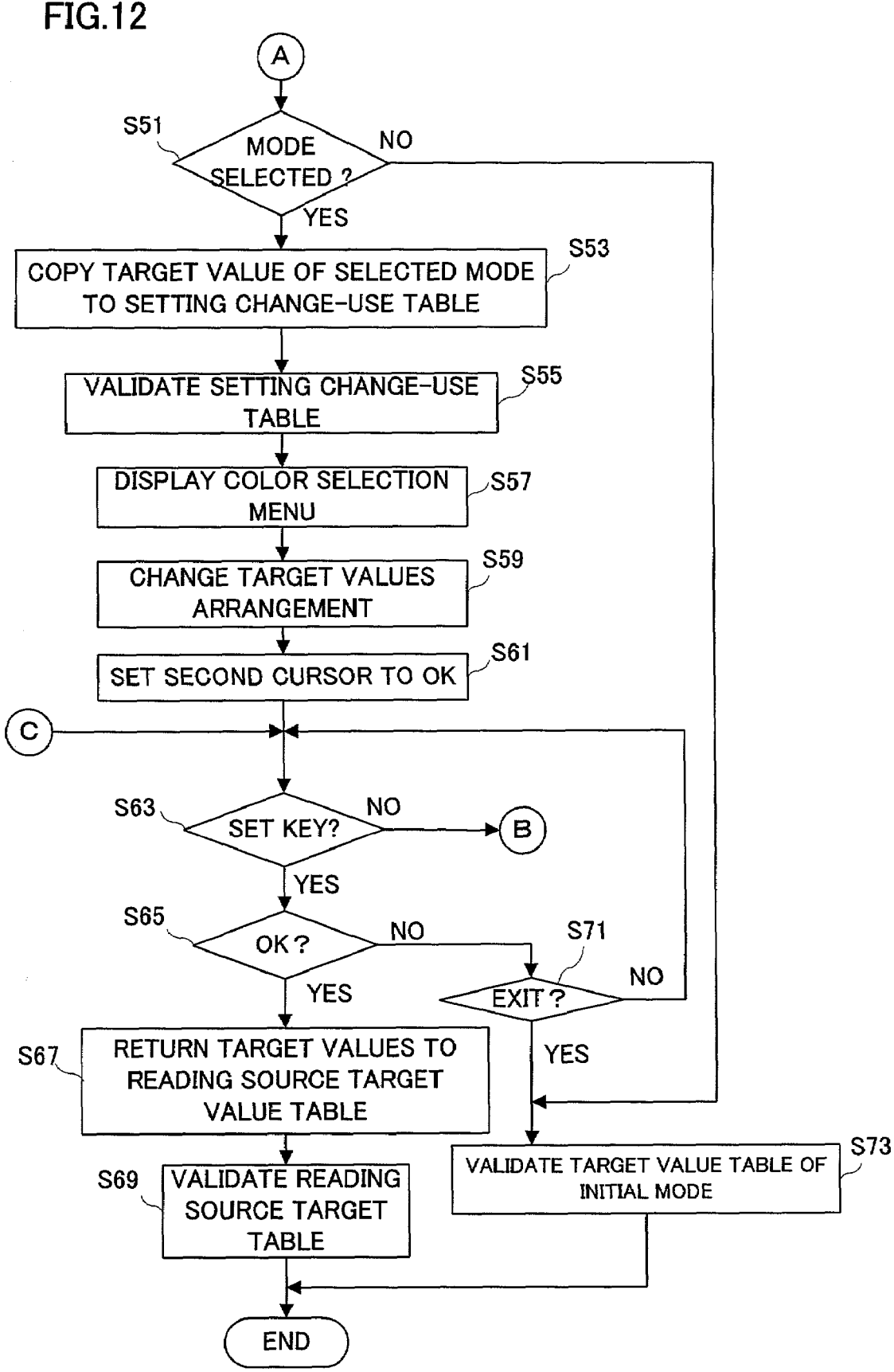
FIG. 12 is a flowchart showing another portion of the operation of the CPU in the setting change mode.
Figure 13:
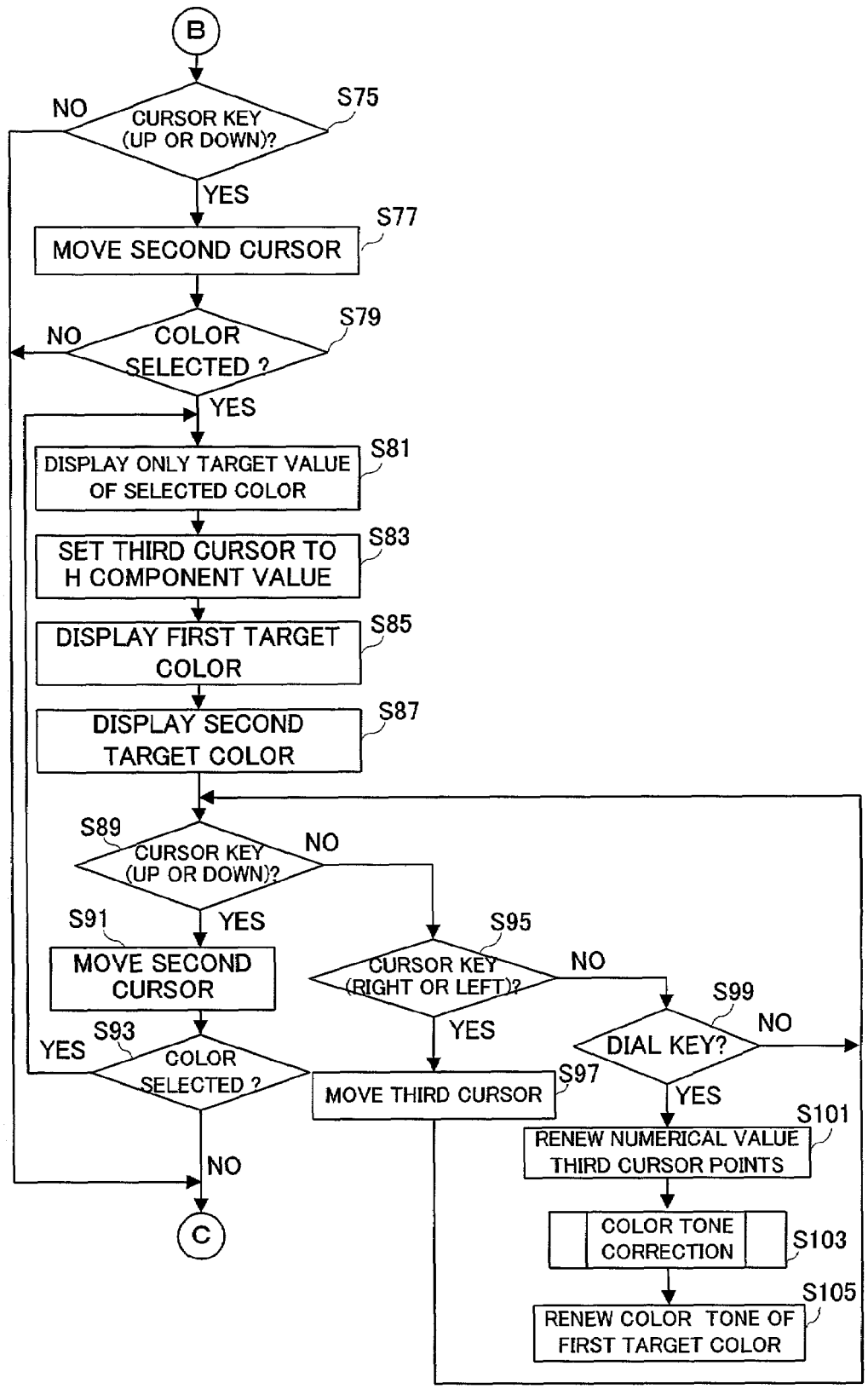
FIG. 13 is a flowchart showing the other portion of the operation of the CPU in the setting change mode.

The L adjusting circuit 22d fetches a current pixel L component value Lin from the LCH conversion circuit 22c so as to evaluate a corrected L component value Lout shown in FIG. 10 according to an Equation 4. Lmax and Lmin shown in FIG. 10 are a maximum value and a minimum value of L (luminance) to be reproduced, respectively. The current pixel value (inputted pixel value) exists on a surface formed of LCH system coordinates (Lmax, 0 ,0), (Lmin, 0, 0), and (Lr3, Cr3, Hin) (surface on which the YUV space is carved out by the hue Hin). On the other hand, the corrected pixel value exists on a surface formed of LCH system coordinates (Lmax, 0 ,0), (Lmin, 0, 0), and (Lt3, Ct3, Hout) (surface on which the YUV space is carved out by the hue Hout).

$$Lout = (Lin - La) \cdot (Ld - Lc)/(Lb - La) + Lc \qquad \text{(Equation 4)}$$

$$La = Cin/Cr3 \cdot (Lr3 - Lmin)$$

$$Lb = Cin/Cr3 \cdot (Lr3 - Lmax) + Lmax$$

$$Lc = Cout/Ct3 \cdot (Lt3 - Lmin)$$

$$Ld = Cout/Ct3 \cdot (Lt3 - Lmax) + Lmax$$

$$Lr3 = Lr1 + (Lr2 - Lr1) \cdot \beta/(\alpha + \beta)$$

$$Lt3 = Lt1 + (Lt2 - Lt1) \cdot \delta/(\gamma + \delta)$$

The corrected pixel value is defined by the corrected H component value Hout, the corrected C component value Cout, and the corrected L component value Lout thus evaluated. It is noted that the current pixel value is defined by the current pixel H component value Hin, the current pixel C component value Cin, and the current pixel L component value Lin outputted from the LCH conversion circuit 22c.

If the operator operates a setting change key 44 so as to select a setting change mode in a state where the through image is displayed on the monitor 30, a process of the CPU 52 is carried out in accordance with flowcharts shown in FIG. 17~FIG. 20. Firstly, a mode selection menu is displayed on the monitor 30 in a step S31, and the target H component values and the target C component values stored in the target value table (any one of 22i~22k) corresponding to the current mode and, in addition, corresponding to the representative colors are displayed on the monitor 30 in a normalized manner in a step S33, then a first cursor C1 is set to a menu item showing the current mode in a step S35. The character signal generating circuit 34 is controlled in any of the steps S31~S33, and if the current mode is 1, a character shown in FIG. 14 is displayed on the through image in an OSD manner.

Figure 14:
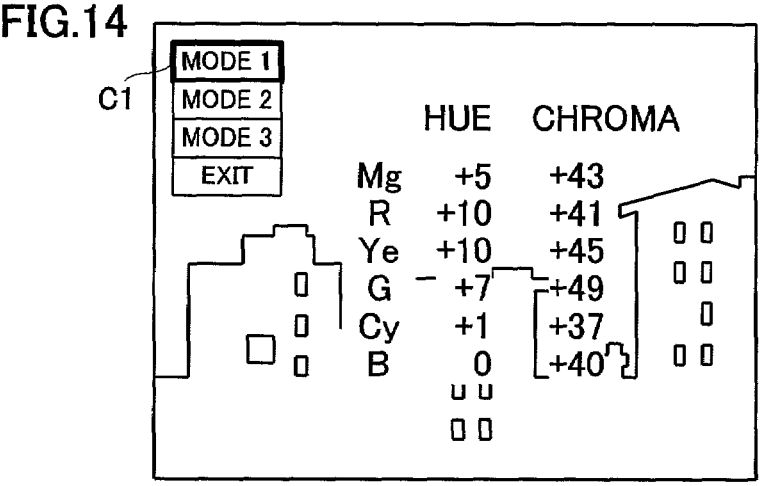
FIG. 14 is an illustrative view showing one example of a setting change screen.

According to FIG. 14, a mode selection menu formed of menu items of "MODE 1", "MODE 2", "MODE 3", and "EXIT" is displayed at an upper left of the screen, the six target H component values and the six target C component values read out from the target value table 22i corresponding to the MODE 1 and normalized in a range of "−50"~"+50" are displayed at a center of the screen, and the first cursor C1 points out the "MODE 1".

The normalized six target H component values are arranged in a vertical direction, and a character of "HUE" is displayed above the vertical column. The normalized six target C component values are also arranged in a vertical direction, and a character of "CHROMA" is displayed above the vertical column. Both the target H component values and the target C component values are arranged in a vertical direction in order of "Mg", "R", "Ye", "G", "Cy", and "B", and the characters are arranged in order of "Mg", "R", "Ye", "G", "Cy", and "B" at a left side of the target H component values. Accordingly, it becomes possible to easily recognize which of the hue or the chroma each numerical value indicates, and to which representative color each numerical value corresponds. It is noted that the character display of "HUE", "CHROMA", "Mg", "R", "Ye", "G", "Cy", and "B" is performed in the step S33.

It is determined whether or not the cursor key 46 is operated in a step S37, and if NO is determined, then the process directly proceeds to a step S49. However, if YES is determined, the first cursor C1 is moved to a desired direction in a step S39. A current pointing destination of the first cursor C1 is determined in a step S41, and if the pointing destination is "EXIT", a display of the target H component values, the target C component values, and the characters of "HUE", "CHROMA", "Mg", "R", "Ye", "G", "Cy", and "B" is cancelled in a step S45 and then the process proceeds to the step S49.

If the pointing destination of the first cursor C1 is any one of "MODE 1", "MODE 2", and "MODE 3", the target H component values and the target C component values of the mode selected by the first cursor C1 are displayed on the monitor 30 in a step S43. More specifically, the target H component values and the target C component values are read out from the target value table (any one of 22i~22k) corresponding to the selected mode, and the character signal generating circuit 34 is instructed to display the read target H component values, the target C component values, and the characters of "HUE", "CHROMA", "Mg", "R", "Ye", "G", "Cy", and "B". The target H component values and the target C component values being displayed on the monitor 30 are renewed by the read target H component values and the read target C component values.

The target value table corresponding to the selected mode is validated in a step S47. The area determining circuit 22g shown in FIG. 2 executes a process shown in FIG. 7 by referring to the validated target table and the reference value table 22h in a step S47. Therefore, a color tone (color reproduction characteristic) of the through image displayed on the monitor 30 changes at every time that the first cursor C1 is moved among "MODE 1", "MODE 2" and "MODE 3".

It is determined whether or not the set key 50 is operated in the step S49, and if there is no key operation, the process returns to the step S37. However, if the key operation is performed, the pointing destination of the first cursor C1 is determined in a step S51. While the first cursor C1 selects "EXIT", NO is determined in the step S51. Then, the setting change mode is ended after validating the target value table of an initial mode (mode selected at a time of starting a process of the setting change mode) in a step S73.

On the other hand, if the pointing destination of the first cursor C1 is "MODE 1", "MODE 2", or "MODE 3", the process proceeds to a step S53 from the step S51 so as to copy the target H component values, the target C component values, and the target L component values of the target value table (any one of 22i~22k) corresponding to a mode selected by the first cursor C1 to the setting change-use table 22r. Furthermore, the setting change-use table 22r is validated in a step S55. A process in the step S55 causes the area determining circuit 22g shown in FIG. 2 to execute a process shown in FIG. 7 by referring to the setting change-use table 22r and the reference value table 22h.

A color selection menu is displayed on the monitor 30 in a step S57, an arrangement of the target H component values and the target C component values is changed in a step S59, and a second cursor C2 is set to "OK" in the color selection menu in a step S61. The character signal generating circuit 34 is controlled in any of the steps S57~S61, a character is displayed on the through image in an OCD manner on the monitor 30 shown in FIG. 15.

Figure 15:
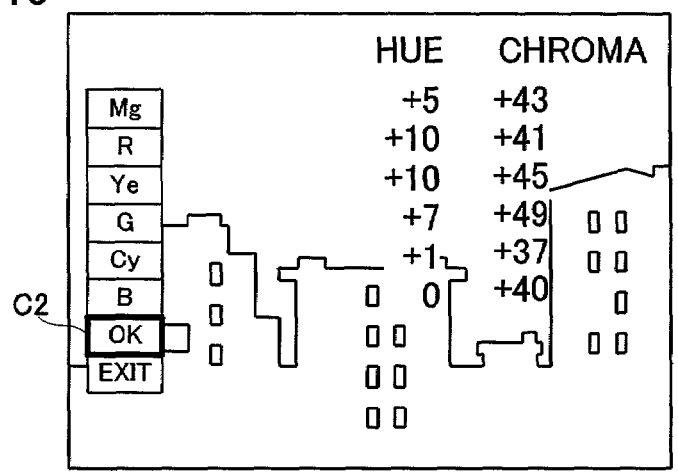
FIG. 15 is a an illustrative view showing another example of the setting change screen.

According to FIG. 15, the color selection menu formed of menu items of "Mg", "R", "Ye", "G", "Cy", "B", "OK", and "EXIT" is displayed at a left side of the screen, the six target H component values and the six target C component values are displayed at a slightly right side of the center of the screen, and the second cursor C2 points out "OK". At this time, the display of the characters of "Mg", "R", "Ye", "G", "Cy", and "B" is cancelled, and the menu items indicating "Mg", "R", "Ye", "G", "Cy", and "B" are brought into being associated with the corresponding target H component values and the target C component values instead thereof.

It is determined whether or not the set key 46 is operated in a step S63, and if the key operation is performed, the current pointing destination of the second cursor C2 is determined in steps S65 and S71. If the pointing destination of the second cursor C2 is "OK", the process proceeds from the step S65 to a step S67 so as to store the target H component values, the target C component values, and the target L component values of the setting change-use table 22r into a reading source target value table. The reading source target value table is validated in a step S69, and then, the process is ended. On the other hand, if the pointing destination of the second cursor C2 is "EXIT", the process proceeds from the step S71 to a step S73 so as to validate the target value table of the initial mode, and then the process is ended.

The mode corresponding to the target value table validated in the step S69 or S73 becomes "a current mode" in the step S33 and S35 executed at a next time. It is noted that if the set key 50 is operated in a state where the second cursor C2 points out the menu item indicating the representative color, the key operation becomes invalidated.

If NO is determined in the step S63, it is determined whether or not the cursor key 46 is operated in an up/down direction in a step S75. Herein, if NO is determined, the process returns to the step S63. However, if YES is determined, the second cursor C2 is moved to a desired direction in a step S77. In a subsequent step S79, a pointing destination of the second cursor C2 after the move is determined, and the process returns to the step S63 if the second cursor C2 selects "OK" or "EXIT".

In contrast, if the second cursor C2 selects a menu item indicating any one of the representative colors, the process proceeds from the step S79 to a step S81 so as to display only the target H component values and the target C component values corresponding to the selected representative color on the monitor 30. A third cursor C3 is set to the target H component values to be displayed in a step S83, and samples of a target color corresponding to the selected representative color are displayed on the monitor 30 as a first target color Clr1 and a second target color Clr2 in respective steps of S85 and S87.

In the step S85, more specifically, the target value (the target H component value, the target C component value, and the target L component value) of the selected representative color is detected from the setting change-use table 22r, and the detected target value is set to a first register 52a as a first target value, and the color signal generating circuit 36 is instructed to output a first color sample signal (first target color signal) in accordance with the first target values set to the first register 52a. In the step S87, the target value of the selected representative color (the target H component values, the target C component values, and the target L component value) is detected from the setting change-use table 22r, the detected target value is set to a second register 52b as a second target value, and the color sample signal generating circuit 36 is instructed to output a second color sample signal (second target color signal) in accordance with the second target values set to the second register 52b. The color sample signal generating circuit 36 outputs the first target color signal and the second target color signal responding to the instruction, and the outputted first target color signal and second target color signal are applied to the monitor 30 via the switch SW1.

Figure 16:
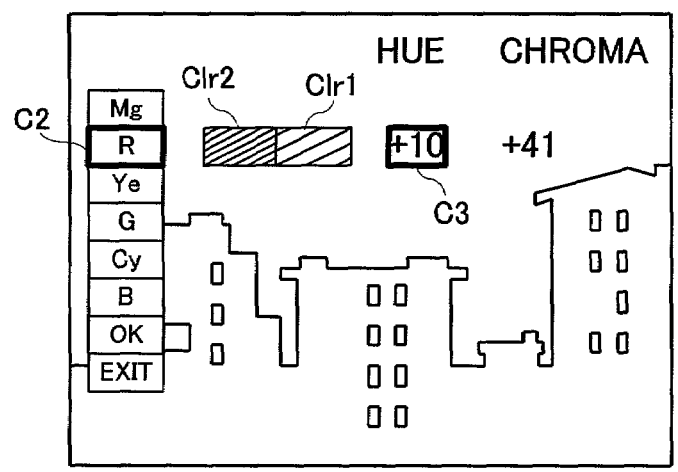
FIG. 16 is a an illustrative view showing the other example of the setting change screen.
Figure 17:
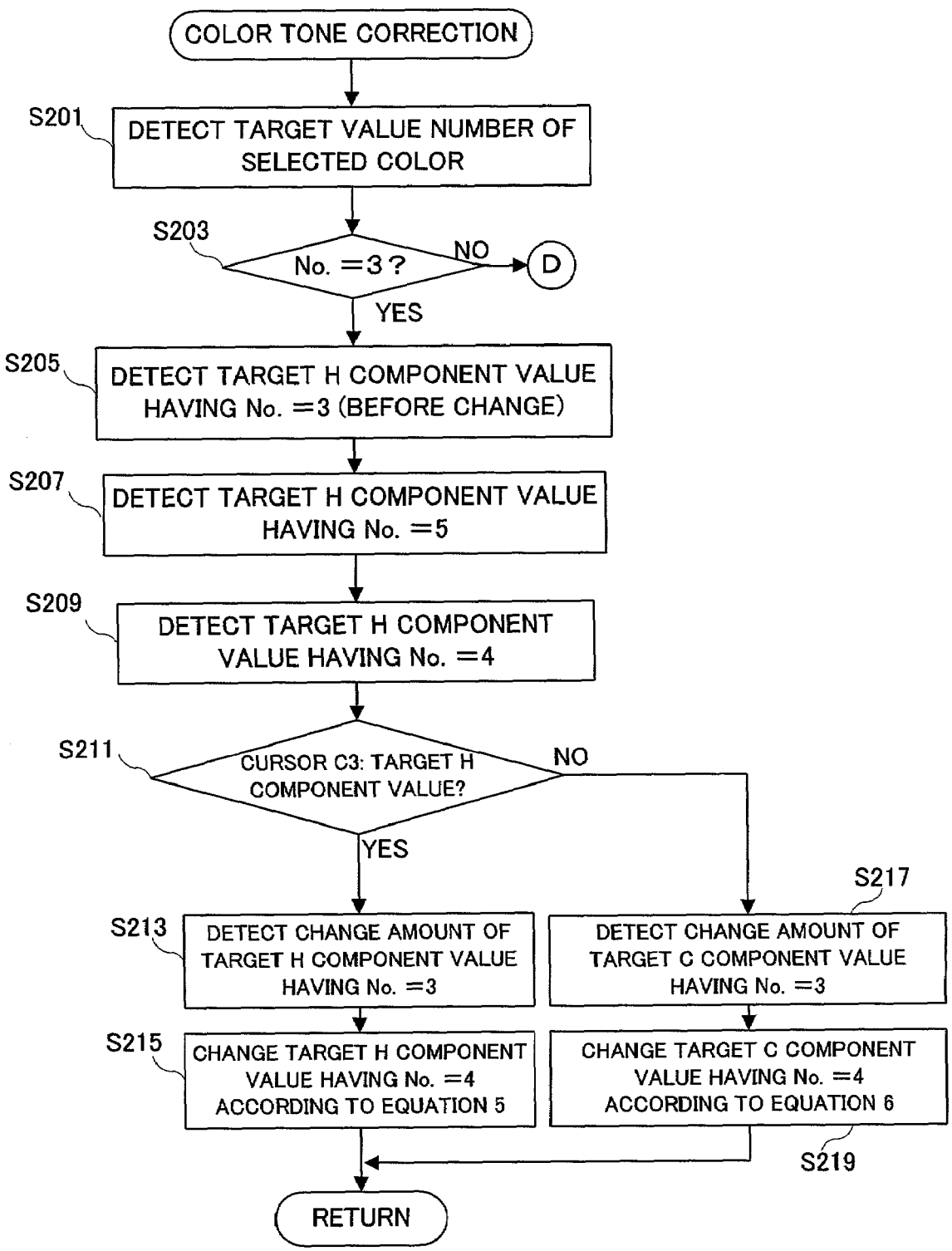
FIG. 17 is a flowchart showing a portion of an operation of a CPU at a time of a color tone correction.

Therefore, when the representative color "R" is selected from the color selection menu shown in FIG. 15, a screen display is renewed from FIG. 15 to FIG. 16. According to FIG. 16, only the target H component values (=+10) and the target C component values (=+41) corresponding to "R" are displayed, the third cursor C3 is set to the target H component values, and a first target color (first color sample) Clr1 and a second target color (second color sample) Clr2 of "R" are displayed to be brought closer with each other between the second cursor C2 and the third cursor C3.

It is determined whether or not the cursor key 46 is operated in an up/down direction in a step S89, it is determined whether or not the cursor key 46 is operated in a right/left direction in a step S95, and it is determined whether or not the dial key 48 is operated in a step S99.

If the cursor key 46 is operated in the up/down direction, YES is determined in the step S89, and then the cursor C2 is moved to a desired direction in a step S91. A menu item selected by the second cursor C2 after the move is determined in a step S93, and if the selected menu item is a representative color, the process returns to the step S81, and if the selected menu item is "OK" or "EXIT", the process returns to the steps 63, respectively. If the cursor key 46 is operated in the right/left direction, YES is determined in the step S95, and the third cursor C3 is moved to a desired direction in a step S97. The pointing destination of the third cursor C3 changes between the target H component values and the target C component values. The process returns to the step S89 after ending the step S97.

If the dial key 48 is operated, YES is determined in the step S99, and a numerical value the third cursor C3 points out (the target H component values or the target C component values) is renewed in a step S101, and numerical values (target H component values or target C component values) corresponding to the non-representative colors are corrected by a linear approximation in a step S103. More specifically, the setting change-use table 22r and the first register 52a are accessed, and then the target H component value or the target C component value selected by the third cursor C3 is renewed in response to an operation of the dial key 48, and the target H component value or the target C component value (pointing destination of the third cursor C3) of the non-representative color is corrected in accordance with subroutines shown in FIG. 17~FIG. 24. Since the area determining circuit 22g refers to the setting change-use table 22r and the reference value table 22h, a color tone of the through image changes in response to the operation of the dial key 48.

The color sample signal generating circuit 36 is instructed to output the first target color signal in accordance with the first target value (the target H component values, the target C component values, and the target L component value) set to the first register 52a in a step S105. Accordingly, the color tone of the first target color Clr1 is also changed in response to an operation of the dial key 48. The process returns to the step S89 after ending the step S105.

Next, a color correction of the non-representative color is described by referring to FIG. 17~FIG. 24. Firstly, the target value number of a desired representative color (the representative color selected by the second cursor C2) is detected in a step S201, and the detected target value number is determined in steps S203, S221, S257, S293, and S311.

If the determined target value number is "3", the process proceeds from the step S203 to a step S205 so as to detect the target H component value having the target value number of "3" as the target H component value of the desired representative color. The target H component value is before the operation of dial key 48, and therefore, in a case that the target C component value is changed by a dial key 46, the target H component value detected in the step S205 is coincident with a current target H component value. A target H component value having the target value number of "5" is detected as the target H component value of a specific representative color (the representative color adjacent to the desired representative color with regard to a hue) in a step S207. In addition, the target H component value having the target value number of "4" is detected as the target H component value of a specific non-representative color (the non-representative color sandwiched by the desired representative color and the specific representative color with regard to the hue) in a step S209.

It is noted that the target H component value of the specific representative color and the target H component value of the specific non-representative color are detected from the setting change-use table 22r. Furthermore, the target H component value of the desired representative color is detected based on the current target H component value set on the setting change-use table 22r and an operation amount of the dial key 46.

It is determined which of the target H component value or the target C component value the third cursor C3 points out in a step S211. If the pointing destination is the target H component value, the process proceeds to a step S213 so as to calculate a change amount of the target H component value corresponding to the desired representative color (target value number=3), that is, the change amount of the target H component value by a current operation of the dial key 48. Furthermore, the target H component value of the specific non-representative color (target value number=4) is changed according to an Equation 5 in a step S215. More specifically, the change amount of the target H component value of the specific non-representative color is calculated by the linear approximation, the calculated change amount is added to the current target H component value of the specific non-representative color, and then the added value is written into a column which corresponds to the target value number "4" on the setting change-use table 22r as a changed target H component value.

$$HtYZ=|HtY-HtZ| \quad \text{(Equation 5)}$$

$$HtYX=|HtY-HtX|$$

$$\Delta HtZ=\Delta HtX*(HtYZ/HtYX)$$

$$HtZ'=HtZ+\Delta HtZ$$

X: target value number of the desired representative color
Y: target value number of the specific representative color
Z: target value number of the specific non-representative color
HtYZ: absolute value of a difference between the target H component value of the specific representative color and the target H component value of the specific non-representative color
HtYX: absolute value of a difference between the target H component value of the specific representative color and the target H component value of the desired representative color (before being changed)
ΔHtZ: change amount of the target H component value of the specific non-representative color
ΔHtX: change amount of the target H component value of the desired representative color
HtZ': target H component value of the specific non-representative color (before being changed)
HtZ: target H component value of the specific non-representative color (after being changed)

On the other hand, if the third cursor C3 points out the target C component value, a change amount of the target C component value which corresponds to the desired representative color (target value number=3), that is, the change amount of the target C component value by a current operation of the dial key 48 is calculated in a step S217, and the target C component value of the specific non-representative color (target value number=4) is changed according to an Equation 6 in a step S219. More specifically, the change amount of the target C component value of the specific non-representative color is calculated by the linear approximation, the calculated change amount is added to the current target C component value of the specific non-representative color, and then the added value is written into a column which corresponds to the target value number "4" on the setting change-use table 22r as a changed target C component value.

$$HtYZ=|HtY-HtZ| \quad \text{(Equation 6)}$$

$$HtYX=|HtY-HtX|$$

$$\Delta CtZ=\Delta CtX*(HtYZ/HtYX)$$

$$CtZ'=CtZ+\Delta CtZ$$

ΔCtZ: change amount of the target C component value of the specific non-representative color
ΔCtX: change amount of the target C component value of the desired representative color
CtZ': target C component value of the specific non-representative color (after being changed)
CtZ: target C component value of the specific non-representative color (before being changed)

Accordingly, with respect to the specific non-representative color (target value number=4) having a hue sandwiched by the hue of the desired representative color (target value number=3) and the hue of the specific representative color (target value number=5), the target H component value or the target C component value is corrected. The process returns to a routine on a higher hierarchy after completing the processes in the step S211 or the step S217.

Figure 25:
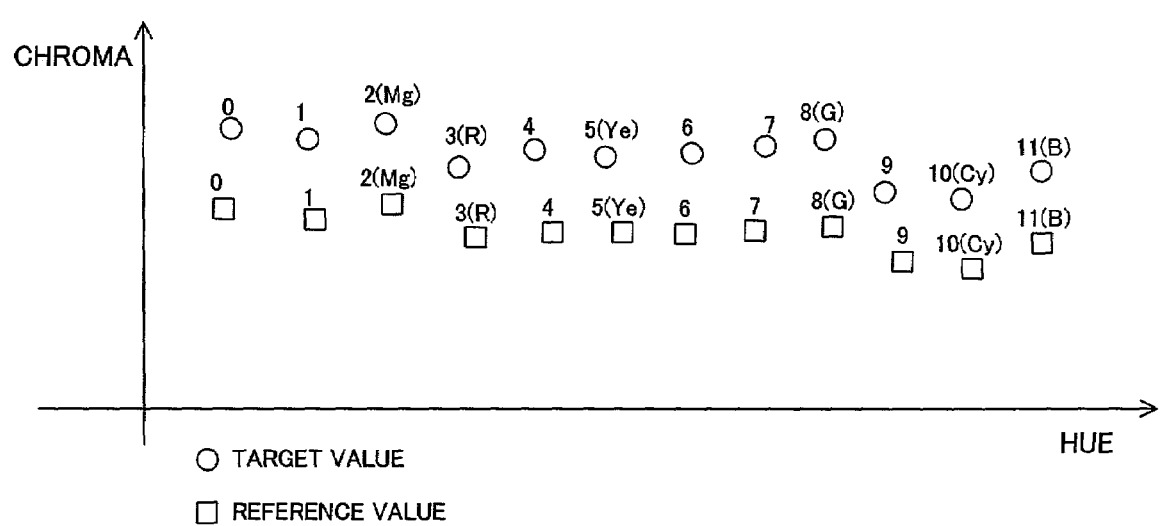
FIG. 25 is an illustrative view showing one example of a distribution state of the reference values and the target values.
Figure 26:
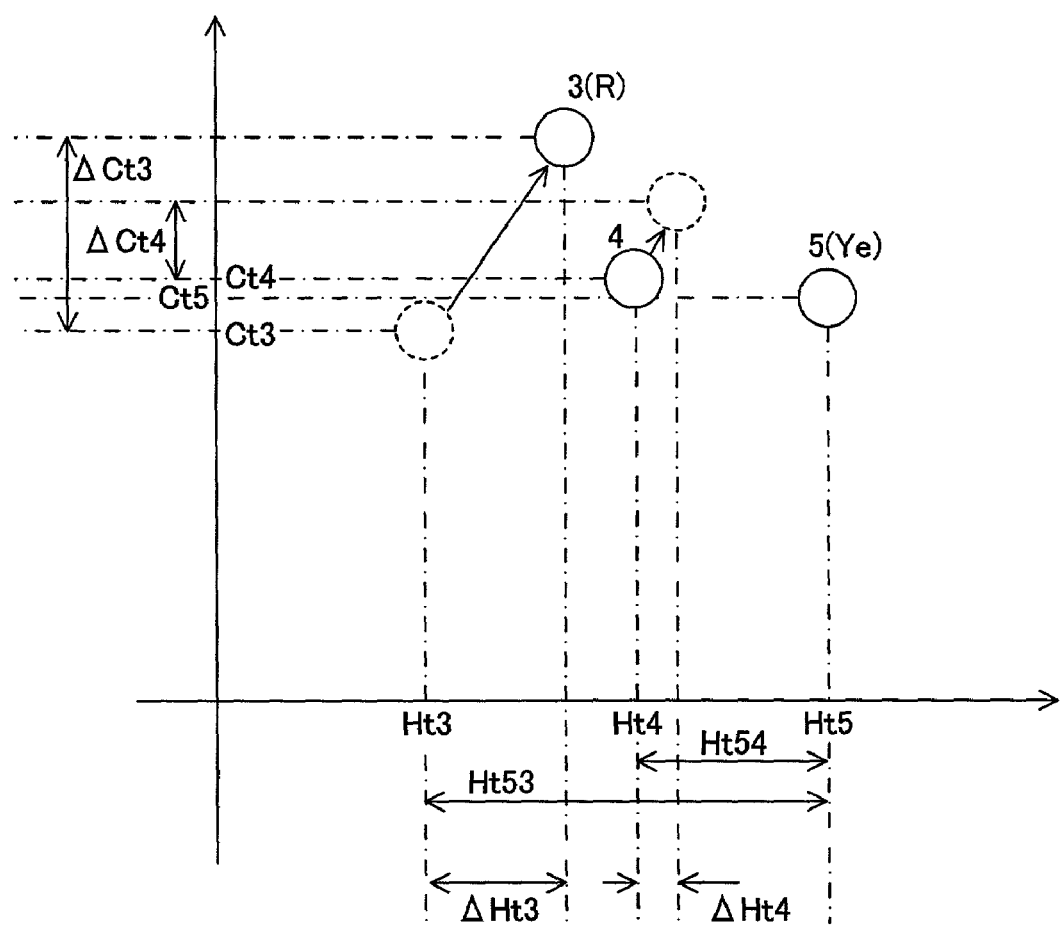
FIG. 26 is an illustrative view showing one example of an operation at a time of the color tone correction.

On a two dimensional plane having the hue and the chroma as axes, the 12 reference H component values and the 12 reference C component values written into the reference value table 22h, and the 12 target H component values and the 12 target C component values written into the setting change-use table 22r are distributed as shown in FIG. 25. An area including the target values having the target value numbers "3"~"5" is drawn as shown in FIG. 26. If the target H component value Ht3 and the target C component value Ct3 having the target value number of "3" as are increased by ΔHt3 and ΔCt3, the target H component value Ht4 and the target C component value Ct4 having the target value number of "4" increase by ΔHt4 and ΔCt4. ΔHt4 and ΔCt4 are found by an Equation 7 and an Equation 8, respectively.

$$\Delta Ht4=\Delta Ht3*(Ht54/Ht53) \quad \text{(Equation 7)}$$

$$\Delta Ct4=\Delta Ct3*(Ht54/Ht53) \quad \text{(Equation 8)}$$

In this operation, "3" becomes the target value number of the desired representative color, "5" becomes the target value number of the specific representative color, and "4" becomes the target value number of the specific non-representative color. In addition, as understood from FIG. 26, the Equation 7, and the Equation 8, both ΔHt4 and ΔCt4 are found by the linear approximation based on Ht54 and Ht53.

Figure 18:
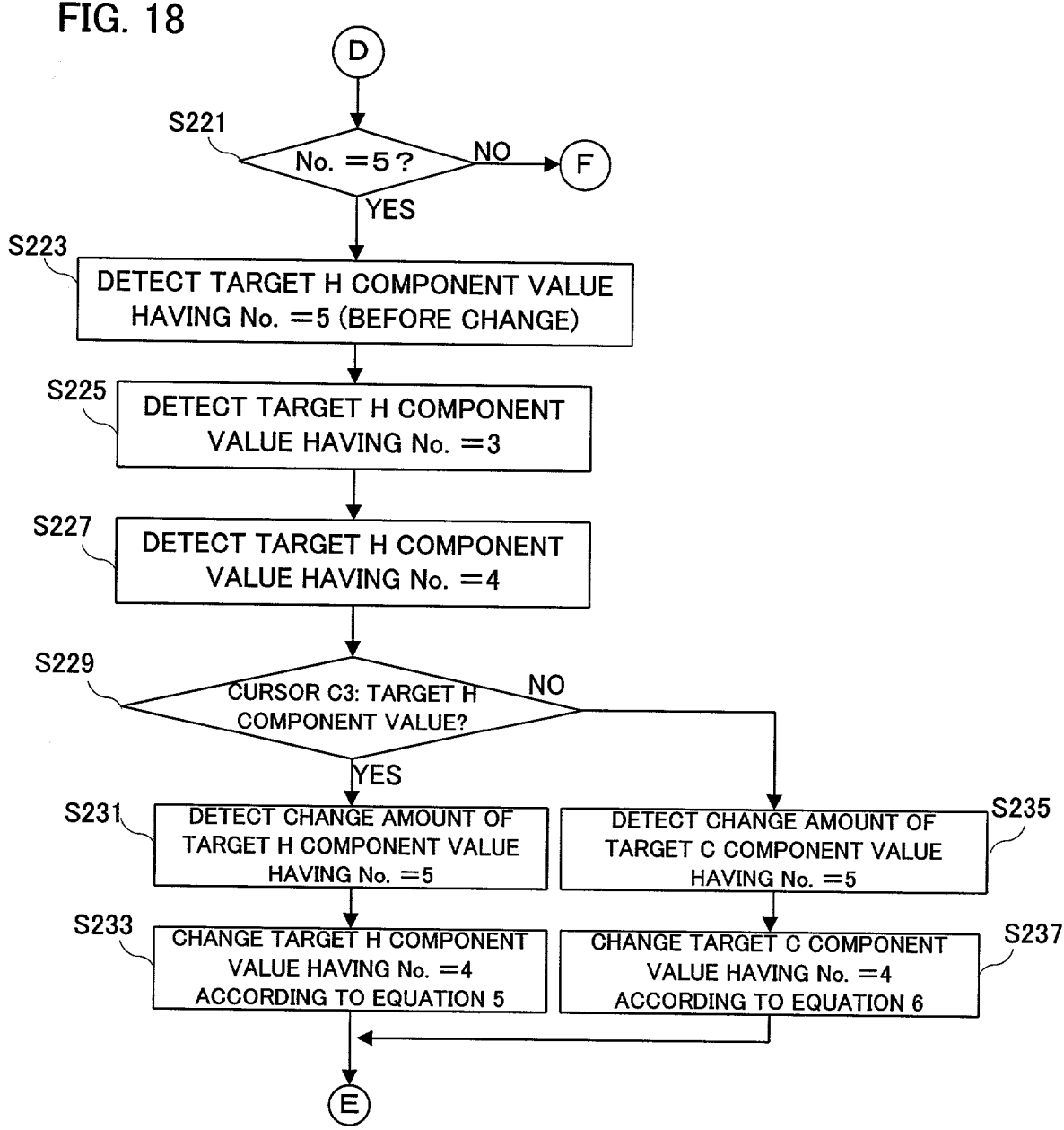
FIG. 18 is a flowchart showing another portion of the operation of the CPU at a time of the color tone correction.
Figure 19:
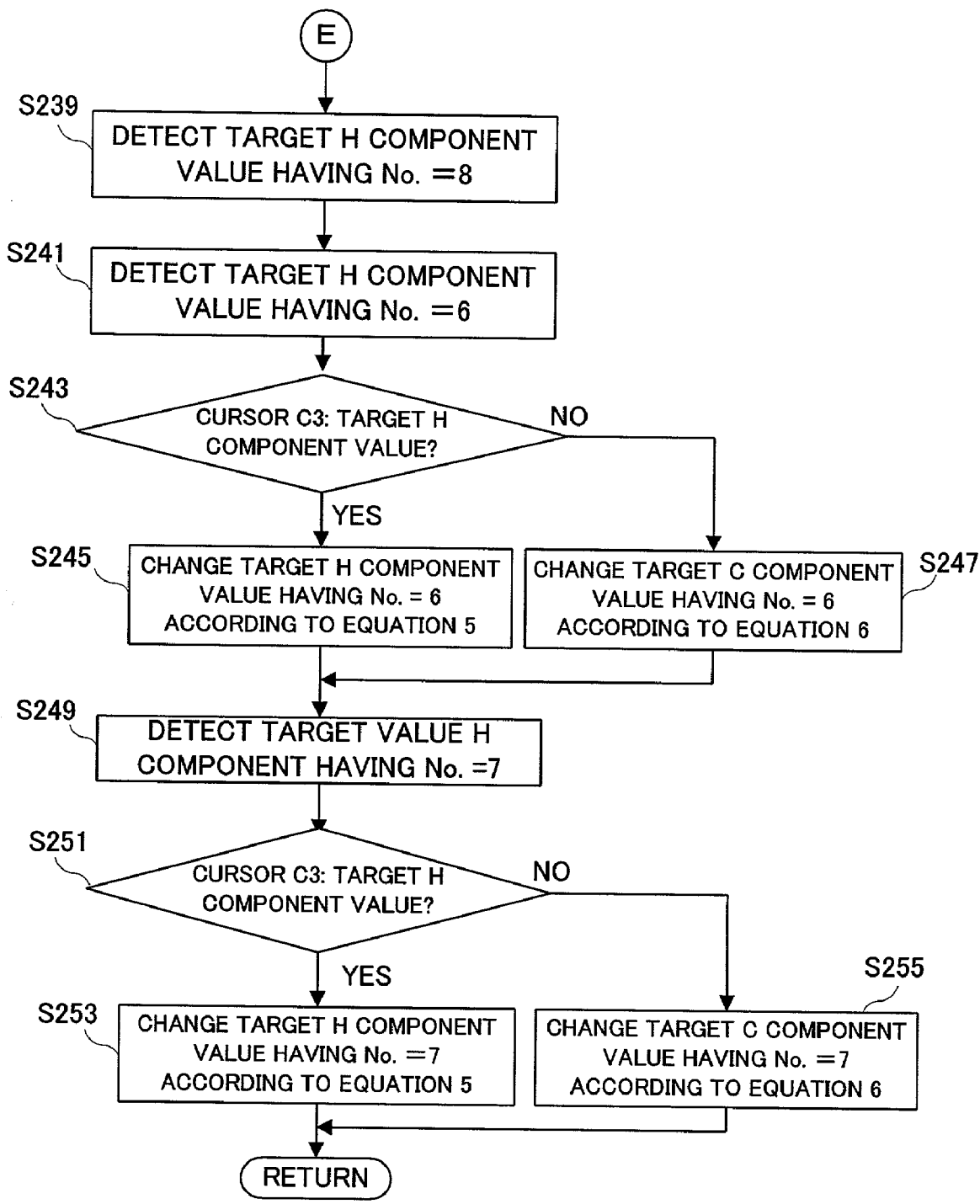
FIG. 19 is a flowchart showing the other portion of the operation of the CPU at a time of the color tone correction.

If the determined target value number is "5", YES is determined in a step S221 shown in FIG. 18, and a target H component value having the target value number of "5" is detected as the target H component value of the desired representative color in a step S223 (the target H component value is before the key operation). Next, a target H component value having the target value number of "3" is detected as the target H component value of the specific representative color in a step S225, and a target H component value having the target value number of "4" is detected as the target H component value of the specific non-representative color in a step S227.

The pointing destination of the third cursor C3 is determined in a step S229. If the pointing destination is the target H component value, processes in steps S231 and S233 are carried out, and if the pointing destination is the target C component value, processes in steps S235 and S237 are carried out, respectively. A change amount of the target H component value which corresponds to the desired representative color (target value number=5) is detected in a step S231, and the target H component value which corresponds to the specific non-representative color (target value number=4) is changed according to the Equation 5 in the succeeding step S233. The target C component value which corresponds to the desired representative color (target value number=5) is detected in the step S235, and the target C component value which corresponds to the specific non-representative color (target value number=4) is changed according to the Equation 6 in the step S237.

Upon completing the process in the step S233 or S237, a target H component value having the target value number of "8" is newly detected as the target H component value of the specific representative color in a step S239, and a target H component value having the target value number of "6" is newly detected as the target H component value of the specific non-representative color in a step S241. A pointing destination of the third cursor C3 is determined in a step S243. If the pointing destination is the target H component value, the process proceeds to a step S245, and if the pointing destination is the target C component value, the process proceeds to a step S247, respectively. The target H component value of the specific non-representative color (target value number=6) is changed according to the Equation 5 in the step S245, and the target H component value of the specific non-representative color (target value number=6) is changed according to the Equation 6 in the step S247.

The target H component value already detected in the step S223, the change amount already detected in the step S231, and the target H component value newly found in the steps S239 and S241 are used in the operation in the step S245. In addition, the target H component value already detected in the step S223, the change amount already detected in the step S235, and the target H component value newly found in the steps S239 and S241 are used in the operation in the step S247.

A target H component value having the target value number of "7" is newly detected as the target H component value of the specific non-representative color in a step S249, and the pointing destination of the third cursor C3 is determined in a succeeding step S251. If the pointing destination is the target H component value, the process proceeds to a step S253 so as to calculate the target H component value of the specific non-representative color (target value number=7) according to the Equation 5. On the other hand, if the pointing destination is the target C component value, the process proceeds to a step S255 so as to calculate the target C component value of the specific non-representative color (target value number=7) according to the Equation 6.

The target H component value already detected in the steps S223 and S239, the change amount already detected in the step S231, and the target H component value newly detected in the step S249 are used in the operation in the step S253. The target H component value already detected in the steps S223 and S239, the change amount already detected in the step S235, and the target H component value newly detected in the step S249 are used in the operation in the step S255.

Accordingly, the target H component value or the target C component value is corrected with respect to the specific non-representative color (target value number=4, 6 or 7) having the hue sandwiched by the hue of the desired representative color (target value number=5) and the hue of the specific representative color (target value number=3 or 8). Upon completing the process in the step of S253 or S255, the process returns to a routine on a higher hierarchy.

Figure 20:
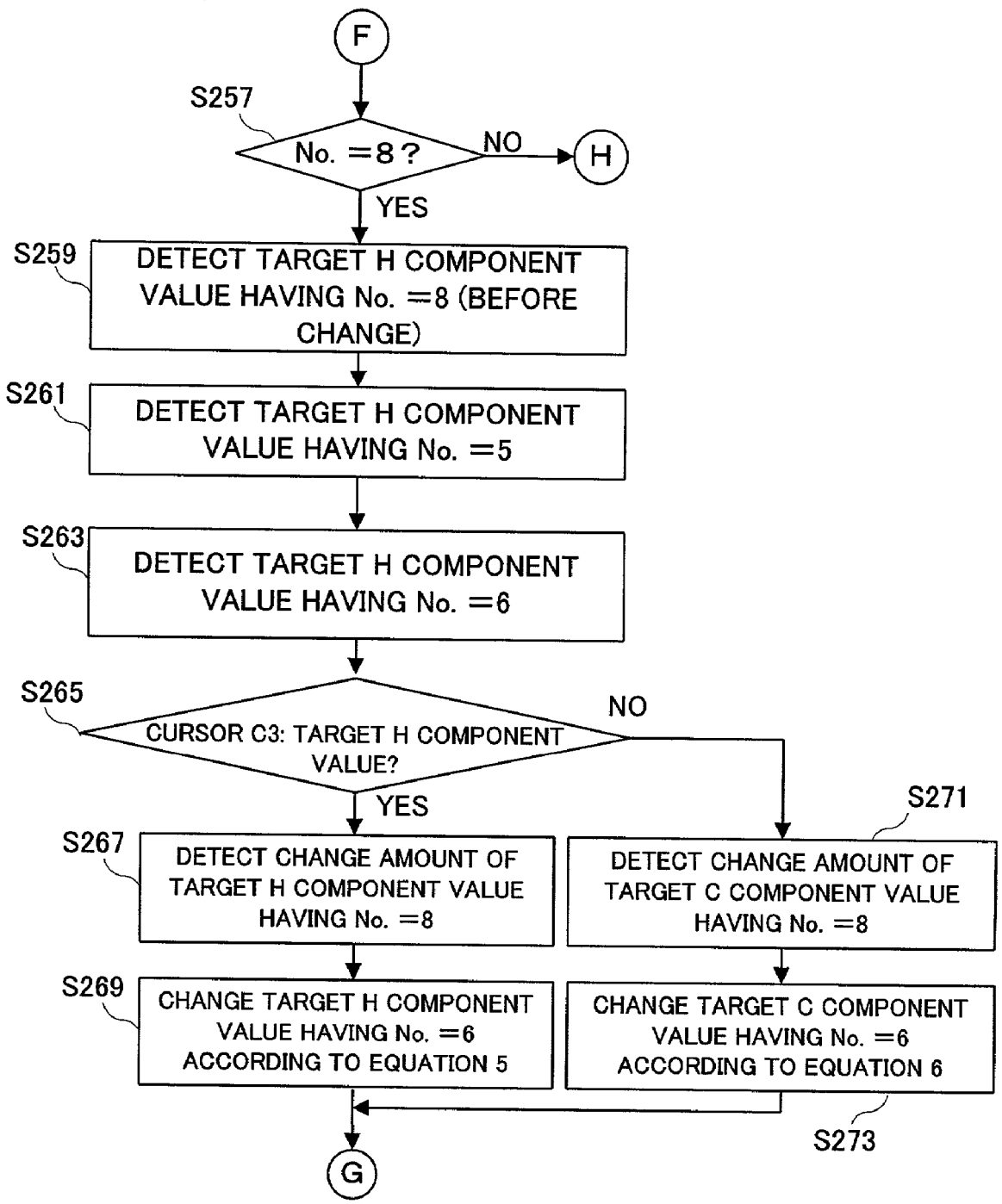
FIG. 20 is a flowchart showing further portion of the operation of the CPU at a time of the color tone correction.
Figure 21:
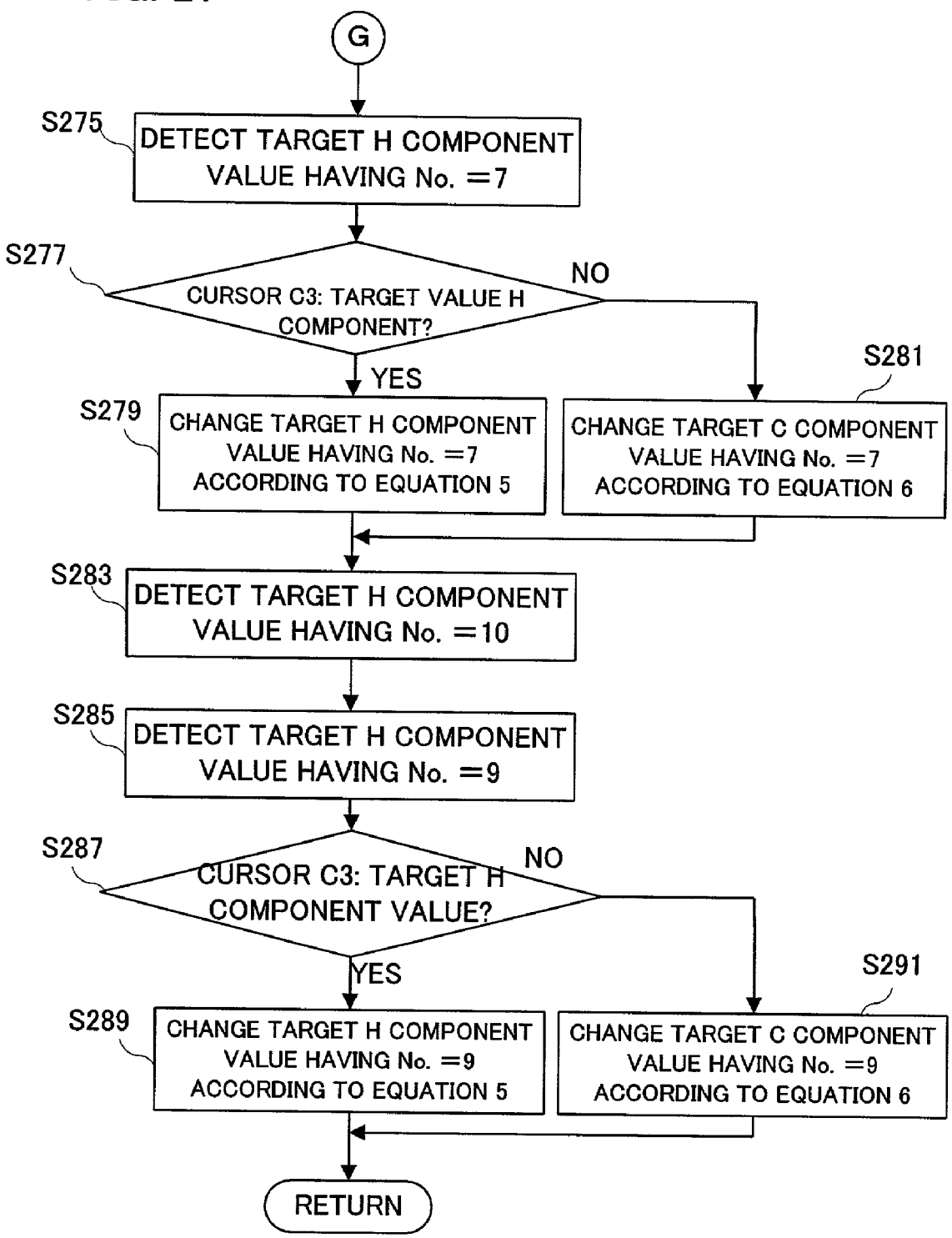
FIG. 21 is a flowchart showing another portion of the operation of the CPU at a time of the color tone correction.
Figure 22:
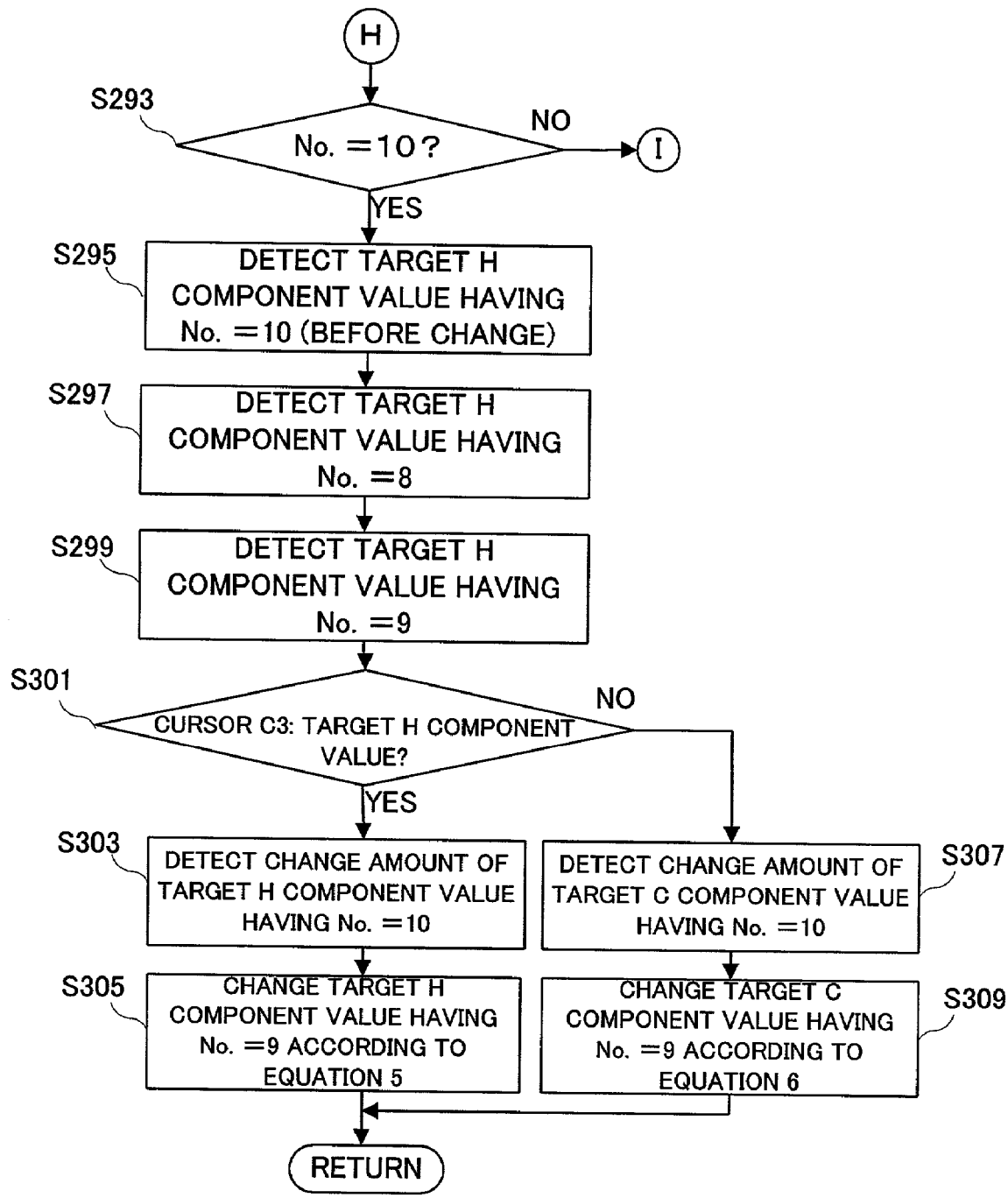
FIG. 22 is a flowchart showing the other portion of the operation of the CPU at a time of the color tone correction.

If the determined target value number is "8", YES is determined in a step S257 shown in FIG. 20, and a target H component value having the target value number of "8" is detected as the target H component value of the desired representative color in a step S259 (the target H component value is before the key operation). The target H component value having the target value number of "5" is detected as the target H component value of the specific representative color in a step S261, and the target H component value having the target value number of "6" is detected as the target H component value of the specific non-representative color in a step S263.

Subsequently, a pointing destination of the third cursor C3 is determined in a step S265, and processes of steps S267 and S269 or steps S271 and S273 are carried out according to a determination result. That is, if the pointing destination of the third cursor C3 is the target H component value, the change amount of the target H component value corresponding to the desired representative color (target value number=8) is detected in a step S267 (the change amount is by the current operation of the dial key 48), and the target H component value which corresponds to the specific non-representative color (target value number=6) is changed according to the Equation 5 in a step S269. On the other hand, if the pointing destination of the cursor C3 is the target C component value, the change amount of the target C component value corresponding to the desired representative color (target value number=8) is detected in a step S271 (the change amount is by the current operation of the dial key 48), and the target C component value which corresponds to the specific representative color (target value number=6) is changed according to the Equation 6 in a step S273.

Upon completing the process in the step of S269 or S273, a target H component value having the target value number of "7" is newly detected as the target H component value of the specific non-representative color in a step S275, and a pointing destination of the third cursor C3 is determined in a step S277. Next, if the pointing destination is the target H component value, the process proceeds to a step S279 so as to change the target H component value of the specific non-representative color (target value number=7) according to the Equation 5. On the other hand, if the pointing destination of the third cursor C3 is the target C component value, the process proceeds to a step S281 so as to change the target C component value of the specific non-representative color (target value number=7) according to the Equation 6.

The target H component value already detected in the steps S259 and S261, the change amount already detected in the step S267, and the target H component value newly detected in the step S275 are used in the operation in the step S279. The target H component value already detected in the steps S259 and S261, the change amount already detected in the step S271, and the target H component value newly detected in the step S275 are used in the operation in the step S281.

A target H component value having the target value number of "10" is detected as the target H component value of the specific representative color in a step S283, a target H component value having the target value number of "9" is detected as the target H component value of the specific non-representative color in a step S285, and a pointing destination of the third cursor C3 is determined in a step S287. If the pointing destination is the target H component value, the target H component value of the specific non-representative color (target value number=9) is changed according to the Equation 5 in a step S289, and if the pointing destination is the target C component value, the target C component value of the specific non-representative color (target value number=9) is changed according to the Equation 6 in a step S291.

The target H component value already detected in the step S259, the change amount already detected in the step S267, and the target H component value newly found in the steps S283 and S285 are used in the operation in the step S289. The target H component value already detected in the step S259, the change amount already detected in the step S271, and the target H component value newly found in the steps S283 and S285 are used in the operation in the step S291.

Accordingly, with respect to the specific non-representative color (target value number=6, 7 or 9) having a hue sandwiched by the hue of the desired representative color (target value number=8) and the hue of the specific representative color (target value number=5 or 10), the target H component value or the target C component value is corrected. The process returns to a routine on a higher hierarchy after completing the processes in the step S289 or the step S291.

If the determined target value number is "10", the process proceeds from a step S293 to a step S295 so as to detect the target H component value having the target value number of "10" as the target H component value of the desired representative color (the target H component value is before the key operation). Subsequently, the target H component value having the target value number of "8" is detected as the target H component value of the specific representative color in a step S297, and the target H component value having the target value number of "9" is detected as the target H component value of the specific non-representative color in a step S299, and then a pointing destination of the third cursor C3 is determined in a step S301.

If the pointing destination is the target H component value, a change amount of the target H component value which corresponds to the desired representative color (target value number=9) is detected in a step S303 (the change amount is by the current key operation), and the target H component value of the specific representative color (target value number=9) is changed according to the Equation 5 in a step S305. On the other hand, if the pointing destination is the target C component value, a change amount of the target C component value of the desired representative color (target value number=10) is detected in a step S307 (the change amount is by the current key operation), and the target C component value of the specific non-representative color (target value number=9) is changed according to the Equation 6 in a step S309.

Accordingly, the target H component value or the target C component value is corrected with respect to the specific non-representative color (target value number=9) having a hue sandwiched by the hue of the desired representative color (target value number=10) and the hue of the specific representative color (target value number=8). Upon completing the process in the step of S305 or S309, the process returns to a routine on a higher hierarchy.

Figure 23:
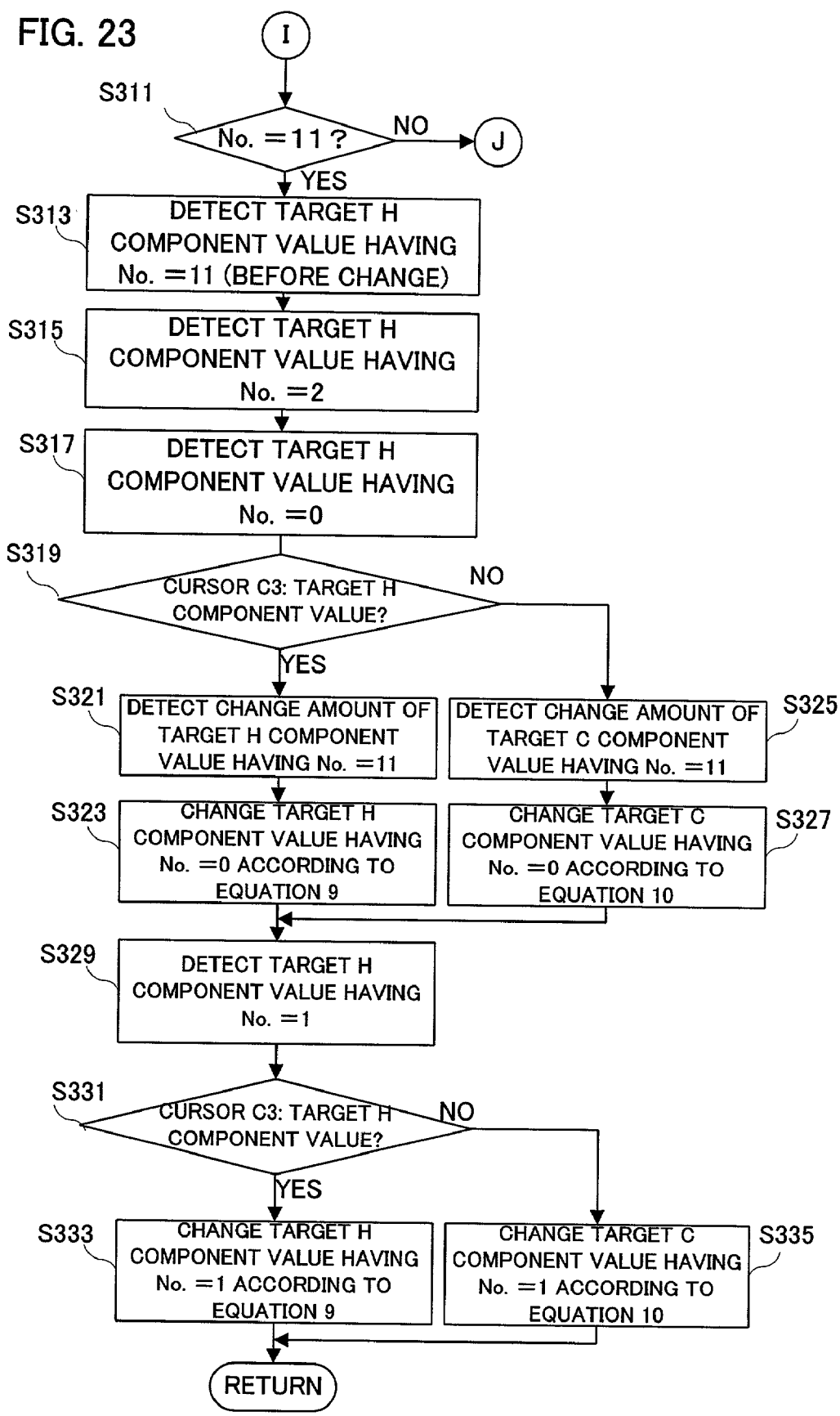
FIG. 23 is a flowchart showing further portion of the operation of the CPU at a time of the color tone correction.

If the determined target value number is "11", YES is determined in a step S311 shown in FIG. 23, and a target H component value having the target value number of "11" is detected as the target H component value of the desired representative color in a step S313 (the target H component value is before the key operation). A target H component value having the target value number of "2" is detected as the target H component value of the specific representative color in a step S315, and a target H component value having the target value number of "0" is detected as the target H component value of the specific non-representative color in a step S317. A pointing destination of the third cursor C3 is determined in a succeeding step S319, and steps of S321 and S323 or steps of S325 and S327 are carried out based on the determination result.

A change amount of the target H component value of the desired representative color (target value number=11) is detected in the step S321 (the change amount is by the current key operation), and the target H component value of the specific non-representative color (target value number=0) is changed according to an Equation 9 in the step S323. The change amount of the target C component value of the desired representative color (target value number=11) is detected in a step S325 (the change amount is by the current key operation), the target C component value of the specific non-representative color (target value number=0) is changed according to an Equation 10 in the step S327.

$$HtX'=HtX-360 \tag{Equation 9}$$

$$HtYZ=|HtY-HtZ|$$

$$HtYX'=|HtY-HtX'|$$

$$\Delta HtZ=\Delta HtX*(HtYZ/HtYX')$$

$$HtZ'=HtZ+\Delta HtZ$$

X: target value number of the desired representative color
Y: target value number of the specific representative color
Z: target value number of the specific non-representative color
HtX': corrected target H component value of the desired representative color
HtYZ: absolute value of a difference between the target H component value of the specific representative color and the target H component value of the specific non-representative color
HtYX': absolute value of a difference between the target H component value of the specific representative color and the corrected target H component value of the desired non-representative color (before being changed)
$\Delta$HtZ: change amount of the target H component value of the specific non-representative color
$\Delta$HtX: change amount of the target H component value of the desired representative color
HtZ': target H component value of the specific non-representative color (after being changed)
HtZ: target H component value of the specific non-representative color (before being changed)

$$HtX'=HtX-360 \tag{Equation 10}$$

$$HtYZ=|HtY-HtZ|$$

$$HtYX'=|HtY-HtX|$$

$$\Delta CtZ=\Delta CtX*(HtYZ/HtYX')$$

$$CtZ'=CtZ+\Delta CtZ$$

ΔCtZ: change amount of the target C component value of the specific non-representative color ΔCtX: change amount of the target C component value of the desired representative color CtZ': target C component value of the specific non-representative color (after being changed)

CtZ: target C component value of the specific non-representative color (before being changed)

A reason why the corrected target H component value is sought by subtracting "360" from HtX is that although the target values having "0", "1", and "2" as the target value number belong to a first quadrant, the target value having the target value number of "11" belongs to a fourth quadrant (see FIG. 5), and therefore, it is not possible to appropriately change the target H component value and the target C component value of the specific non-representative color which belong to the first quadrant by the Equation 5 and the Equation 6.

Upon completing the process in the step S323 or S327, a target H component value having the target value number of "1" is newly detected as the target H component value of the specific non-representative color in a step S329, and a pointing destination of the third cursor C3 is determined in a succeeding step S331. If the pointing destination is the target H component value, the target H component value of the specific non-representative color (target value number=1) is changed according to the Equation 9 in a step S333, and if the pointing destination is the target C component value, the target C component value of the specific non-representative color (target value number=1) is changed according to the Equation 10 in a step S335.

The target H component value already detected in the steps S313 and S315, the change amount already detected in the step S321, and the target H component value newly detected in the steps S329 are used in the operation in the step S333. The target H component value already detected in the steps S313 and S315, the change amount already detected in the step S325, and the target H component value newly detected in the step S329 are used in the operation in the step S335.

Accordingly, with respect to the specific non-representative color (target value number=0 or 1) having a hue sandwiched by the hue of the desired representative color (target value number=11) and the hue of the specific representative color (target value number=2), the target H component value or the target C component value is corrected. The process returns to a routine on a higher hierarchy after completing the processes in the step S333 or the step S335.

Figure 24:
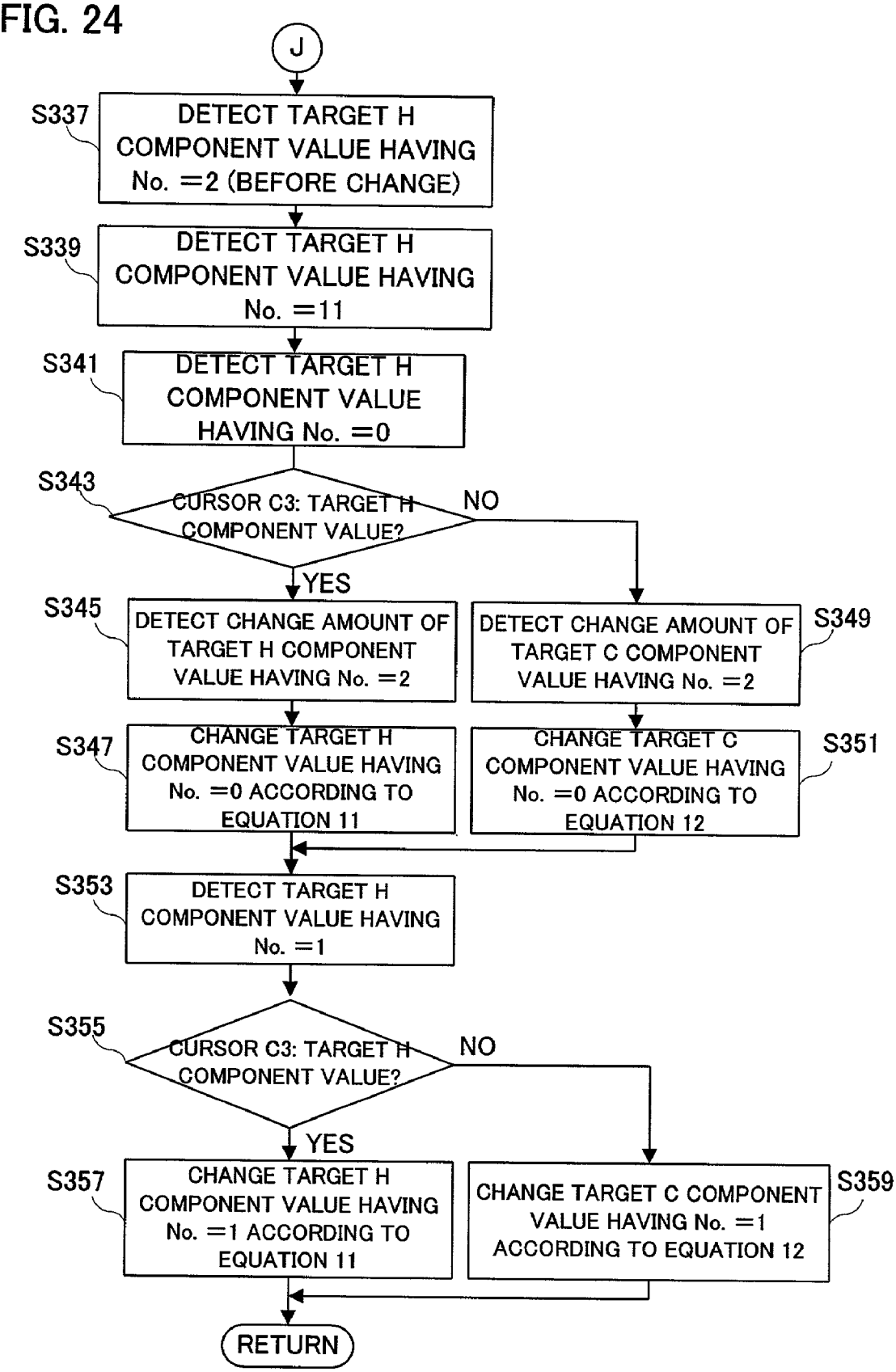
FIG. 24 is a flowchart showing another portion of the operation of the CPU at a time of the color tone correction.

If the determined target value number is "2", the process proceeds from the step S311 shown in FIG. 23 to a step S337 shown in FIG. 24 so as to detect the target H component value having the target value number of "2" as the target H component value of the desired representative color (the target H component value is before the key operation). A target H component value having the target value number of "11" is detected as the target H component value of the specific representative color in a step S339, and the target H component value having the target value number of "0" is detected as the target H component value of the specific non-representative color. Subsequently, the pointing destination of the third cursor C3 is determined in a step S343, and processes of steps S345 and S347 or steps S349 and S351 are carried out in correspondence to a determination result.

A change amount of the target H component value of the desired representative color (target value number=2) is detected in the step S345 (the change amount is by the current key operation), and the target H component value of the specific non-representative color (target value number=0) is changed according to an Equation 11 in the step S347. The change amount of the target C component value of the desired representative color (target value number=2) is detected in the step S349 (the change amount is by the current key operation), and the target C component value of the specific non-representative color (target value number=0) is changed according to an Equation 12 in the step S351. With respect to the Equation 11 and the Equation 12, a reason why the corrected target H component value is sought by subtracting "360" from HtY is the same as the aforementioned Equations 9 and 10.

$$HtY'=HtY-360 \qquad \text{(Equation 11)}$$

$$HtY'Z=|HtY'-HtZ|$$

$$HtY'X=|HtY'-HtX|$$

$$\Delta HtZ=\Delta HtX*(HtY'Z/HtY'X)$$

$$HtZ'=HtZ+\Delta HtZ$$

X: target value number of the desired representative color
Y: target value number of the specific representative color
Z: target value number of the specific non-representative color HtY': corrected target H component value of the specific representative color HtY'Z: absolute value of a difference between the corrected target H component value of the specific representative color and the target H component value of the specific non-representative color HtY'X: absolute value of a difference between the corrected target H component value of the specific representative color and the target H component value of the desired representative color (before being changed)

ΔHtZ: change amount of the target H component value of the specific non-representative color ΔHtX: change amount of the target H component value of the desired representative color HtZ': target H component value of the specific non-representative color (after being changed)

HtZ: target H component value of the specific non-representative color (before being changed)

$$HtY'=HtY-360 \qquad \text{(Equation 12)}$$

$$HtY'Z=|HtY'-HtZ|$$

$$HtY'X=|HtY'-HtX|$$

$$\Delta CtZ=\Delta CtX*(HtY'Z/HtY'X)$$

$$CtZ'=CtZ+\Delta CtZ$$

ΔCtZ: change amount of the target C component value of the specific non-representative color ΔCtX: change amount of the target C component value of the desired representative color CtZ': target C component value of the specific non-representative color (after being changed)

CtZ: target C component value of the specific non-representative color (before being changed)

Upon completing the process in the step S347 or S351, the target H component value having the target value number of "1" is newly detected as the target H component value of the specific non-representative color in a step S353, and a pointing destination of the third cursor C3 is determined in a succeeding step S355. If the pointing destination is the target H component value, the target H component value of the specific non-representative color (target value number=1) is changed according to the Equation 11 in a step S357, and if the pointing destination is the target C component value, the target C component value of the specific non-representative color (target value number=1) is changed according to the Equation 12 in a step S359.

The target H component value already detected in the steps S337 and S339, the change amount already detected in the step S345, and the target H component value newly detected in the step S353 are used in the operation in the step S357. The target H component value already detected in the steps S337 and S339, the change amount already detected in the step S349, and the target H component value newly detected in the step S353 are used in the operation in the step S359.

Accordingly, with respect to the specific non-representative color (target value number=0 or 1) having a hue sandwiched by the hue of the desired representative color (target value number=2) and the hue of the specific representative color (target value number=11), the target H component value or the target C component value is corrected. The process returns to a routine on a higher hierarchy after completing the processes in the step S357 or the step S359.

As understood from the above descriptions, the image data of the object photographed by the CCD imager 14 is subjected to a color adjustment by the signal processing circuit 22 based on a plurality of the first color adjusting values which respectively correspond to a plurality of the representative colors in a primary color system and a complementary color system and a plurality of the second color adjusting values which respectively correspond to a plurality of the non-representative colors different from any one of the representative colors.

If the desired representative color is selected in the setting change mode, a setting change-use screen shown in FIG. 16 is displayed on the monitor 30. The setting change screen is a screen for accepting a change of the first color adjusting values only out of the first color adjusting values and the second color adjusting values, and the setting change-use screen includes a normalized first color adjusting value of a desired representative color and a color sample. It is noted that a background of the setting change-use screen is a through image of the object.

Herein, if the dial key 48 is operated, the first color adjusting value of the desired representative color is changed. Furthermore, the specific first color adjusting value adjacent to the desired first color adjusting value in a hue direction, the specific second color adjusting value sandwiched by the desired first color adjusting value and the specific first color adjusting value with respect to the hue, and a first change amount (change amount of the desired first color adjusting value by the operation of the dial key 48) are detected, and a second change amount (changing amount of the specific second color adjusting value) is calculated by the linear approximation. The specific second color adjusting value is changed according to the calculated second change amount.

Since the specific second color adjusting value is also changed when the desired first color adjusting value is changed by the key operation, it becomes possible to make an appropriate color adjustment even if there is a limit regarding a size of a monitor and the number of operation keys, or an operator does not possess a thorough knowledge. Furthermore, since the representative color in a primary color system and a complementary color system is easier to be accustomed thereto than other non-representative colors, operability is further improved by making it possible to input a change instruction of the first color adjusting value corresponding to such the representative color. Moreover, since the setting change screen includes the color sample, and a color tone (color shade) of the color sample is changed in response to the key operation, it becomes possible to make a visual color adjustment. Since the setting screen includes the normalized first color adjusting value, it becomes possible to make an easy and exact color adjustment. Still furthermore, since the through image of the object is displayed on the monitor, and the color tone of the through image is also changed in accordance with the key operation, the operability is further improved.

It is noted that although only the target H component value and the target C component value are to be arbitrarily changed out of the target H component value, the target C component value, and the target L component value forming the target value in this embodiment, it may be possible to change the target L component value arbitrarily in addition to the target H component value and the target C component value or instead of at least one of the target H component value and the target C component value.

In addition, although the change amount of the specific second color adjusting value is calculated by the linear approximation in this embodiment, it is possible to calculate the change amount by an approximation such as a spline curve or a Bezier curve.

Furthermore, three target value tables which respectively correspond to modes 1~3 are to be prepared on a memory in this embodiment. However, in addition thereto, it may be possible to store a target value table on which default target values are set in the memory. Accordingly, when any one of the modes is not set, it is possible to perform a setting operation using the default target value as a reference.

Still furthermore, although the CCD imager is used as an image sensor in this embodiment, it may be possible to use a CMOS imager instead of the CCD imager. In addition, although a non volatile semiconductor memory is used as a recording medium in this embodiment, it may be possible to use a magnetooptical disk instead thereof.

Furthermore, the primary colors (R, G, B) and the complementary colors (Ye, Cy, Mg) are defined as a representative color, and other colors which do not correspond to any one of the primary colors and the complementary colors are defined as a non-representative color in this embodiment. However, when only one of the primary color and the complementary color is defined as the representative color, it is possible to define a color corresponding to the other of the primary color and the complementary color or a color not corresponding to any one of the primary color and the complementary color as the non-representative color.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   a color adjuster which receives color components of an image signal of an object photographed by a photographer and performs color adjustment of a selected color component based on a plurality of first color adjusting values corresponding to the selected color component, and performs color adjustment of a non-selected color component corresponding to a color other than the selected color component based on at least one second color adjusting value;

a selector, operable by a user of the digital camera, to select for color adjustment a first color from the color components of the image signal of the object;

an inputter for inputting a change instruction to change a desired first color adjusting value out of the plurality of first color adjusting values, the desired first color adjusting value corresponding to the selected first color;

a first changer for changing the desired first color adjusting value in response to the change instruction; and a second changer for changing the second color adjusting value based on a first change amount of the desired first color adjusting value.

2. A digital camera comprising:

an imaging device for capturing an object scene;

a color adjuster for subjecting an object scene image output from said imaging device to a color adjustment based on a plurality of first color adjusting values and at least one second color adjusting value;

an inputter for inputting a change instruction directed to a desired first color adjusting value out of the plurality of first color adjusting values;

a first changer for changing the desired first color adjusting value in response to the change instruction; and a second changer for changing the second color adjusting value based on a first change amount which is a change amount of the desired first color adjusting value, wherein each of the first color adjusting value and the second color adjusting value includes a hue as a parameter, and said second changer includes a first detector for detecting a specific first color adjusting value adjacent to the desired first color adjusting value in a hue direction, a second detector for detecting a specific second color adjusting value sandwiched by the desired first color adjusting value and the specific first color adjusting value with respect to the hue, and a calculator for calculating a second change amount which is a change amount of the specific second color adjusting value based on the desired first color adjusting value, the specific first color adjusting value, the specific second color adjusting value, and the first change amount.

3. A digital camera according to claim 2, wherein the plurality of first color adjusting values respectively correspond to representative colors of at least one of a primary color system and a complementary color system.

4. A digital camera according to claim 2, further comprising an accepting screen displayer for displaying an accepting screen which only accepts a change of the plurality of first color adjusting values out of the plurality of first color adjusting values and the second color adjusting value.

5. A digital camera according to claim 4, wherein the accepting screen includes at least a color sample corresponding to the desired first color adjusting value.

6. A digital camera according to claim 4, wherein the accepting screen includes a normalized first color adjusting value.

7. A digital camera according to claim 2, wherein said color adjuster subjects the object scene image outputted from said imaging device to the color adjustment in a real time, and said digital camera further comprising an image displayer for displaying in a real time the object scene image subjected to the color adjustment.

8. A color adjusting method which subjects an image signal of an object photographed by a photographer to a color adjustment of a selected color component based on a plurality of first color adjusting values corresponding to the selected color component and at least one second color adjusting value corresponding to a color other than the selected color component, comprising steps of:

selecting, in response to a user input, a first color from among the color components of the image signal of the object;

inputting a change instruction to change a desired first color adjusting value out of the plurality of first color adjusting values, the desired first color adjusting value corresponding to the selected first color;

changing the desired first color adjusting value in response to the change instruction; and changing the second color adjusting value based on a first change amount of the desired first color adjusting value.

9. A color adjusting method which subjects an object scene image output from an imaging device to a color adjustment based on a plurality of first color adjusting values and at least one second color adjusting value, comprising steps of:

(a) inputting a change instruction directed to a desired first color adjusting value out of the plurality of first color adjusting values;

(b) changing the desired first color adjusting value in response to the change instruction; and (c) changing the second color adjusting value based on a first change amount which is a change amount of the desired first color adjusting value, wherein each of the first color adjusting value and the second color adjusting value includes a hue as a parameter, and the step (c) includes steps of (c-1) detecting a specific first color adjusting value adjacent to the desired first color adjusting value in a hue direction, (c-2) detecting a specific second color adjusting value sandwiched by the desired first color adjusting value and the specific first color adjusting value with respect to a hue, and (c-3) calculating a second change amount which is a change amount of the specific second color adjusting value based on the desired first color adjusting value, the specific first color adjusting value, the specific second color adjusting value, and the first change amount.

10. A color adjusting method according to claim 9, further comprising step of (d) displaying an accepting screen for accepting a change of the plurality of first color adjusting values only out of the plurality of first color adjusting values and the second color adjusting value prior to the step (a).

11. A digital camera, comprising:

a first memory for storing first color component information including a plurality of first hue values which define a plurality of first hue areas;

a second memory for storing second color component information including a plurality of second hue values which define a plurality of second hue areas respectively corresponding to the plurality of first hue areas;

a hue detector for detecting a pixel hue value that is a hue value of each of a plurality of pixels forming photographed image data;

a first hue reader for reading from said first memory two of the first hue values, which define a specific first hue area to which the pixel hue value detected by said hue detector belongs;

a second hue reader for reading from said second memory two of the second hue values, which define a specific second hue area corresponding to the specific first hue area; and a hue corrector for correcting the pixel hue value detected by said hue detector based on the two of the first hue values read out by said first hue reader and the two of the second hue values read out by said second hue reader, wherein the plurality of first hue values stored in said first memory include a plurality of first representative hue values respectively corresponding to a plurality of representative colors and a plurality of first non-representative hue values respectively corresponding to a plurality of non-representative colors, and the plurality of second hue values stored in said second memory include a plurality of second representative hue values respectively corresponding to the plurality of first representative hue values and a plurality of second non-representative hue values respectively corresponding to the plurality of first non-representative hue values, which are arranged in an ascending order, and said digital camera further comprising:

a selector for selecting any one of the plurality of representative colors;

a first hue specifier for specifying the second representative hue value corresponding to the representative color selected by said selector from among the plurality of second representative hue values;

a second hue specifier for specifying a second representative hue value adjacent to the second representative hue value specified by said first hue specifier from among the plurality of second representative hue values;

a third hue specifier for specifying a second non-representative hue value having a numerical value sandwiched by the second representative hue value specified by said first hue specifier and the second representative hue value specified by said second hue specifier from among the plurality of second non-representative hue values;

a first hue changer for changing the second representative hue value specified by said first hue specifier; and a second hue changer for changing the second non-representative hue value specified by said third hue specifier based on the second representative hue value specified by said first hue specifier, the second representative hue value specified by said second hue specifier, and a changing amount of said first hue changer.

12. A digital camera according to claim 11, wherein the first color component information further includes a plurality of first chroma values respectively corresponding to the plurality of first hue values, and the second color component information further includes a plurality of second chroma values respectively corresponding to the plurality of second hue values, and said digital camera further comprising:

a chroma detector for detecting a pixel chroma value that is a chroma value of each of the plurality of pixels forming the photographed image data;

a first chroma reader for reading two of the first chroma values respectively corresponding to the two of the first hue values read out by said first hue reader;

a second chroma reader for reading two of the second chroma values respectively corresponding to the two of the second hue values read out by said second hue reader; and a chroma corrector for correcting the pixel chroma value detected by said chroma detector based on the two of the first chroma values read out by said first chroma reader and the two of the second chroma values read out by said second chroma reader.

13. A digital camera according to claim 12, wherein the plurality of first chroma values include a plurality of first representative chroma values respectively corresponding to the plurality of representative colors and a plurality of first non-representative chroma values respectively corresponding to the plurality of non-representative colors, and the plurality of second chroma values include a plurality of second representative chroma values respectively corresponding to the plurality of first representative chroma values and a plurality of second non-representative chroma values respectively corresponding to the plurality of first non-representative chroma values, and said digital camera further comprising:

a first chroma changer for changing the second representative chroma value corresponding to the representative color selected by said selector; and a second chroma changer for changing the second non-representative chroma value corresponding to the second non-representative hue value specified by said third hue specifier based on the second representative hue value specified by said first hue specifier, the second representative hue value specified by said second hue specifier, the second non-representative hue value specified by said third hue specifier, and a changing amount of said first chroma changer.

14. A digital camera according to claim 11, further comprising a reception screen displayer for displaying a reception screen which receives a changing operation directed to only the plurality of second representative hue values out of the plurality of second representative hue values and the plurality of second non-representative hue values.

15. A digital camera according to claim 14, wherein the reception screen includes a color sample corresponding to at least the representative color selected by said selector.

16. A digital camera according to claim 14, wherein said reception screen displayer displays the plurality of second representative hue values in a normalized state.

17. A digital camera according to claim 11, wherein said hue corrector subjects image data output from an imager to a real-time hue correction, and said digital camera further comprising an image displayer for displaying an image based on the image data on which the real-time hue correction is performed by said hue corrector.

18. A digital camera, comprising:

a color adjuster which subjects an image signal of an object photographed by a photographer to a color adjustment based on a plurality of first color adjusting values and at least one second color adjusting value, the plurality of first color adjusting values corresponding to target hue and chroma component values for a plurality of colors, and the at least one second color adjusting value corresponding to target hue and chrominance component values for at least one color different from the plurality of colors;

an inputter for inputting a change instruction of a desired first color adjusting value out of the plurality of first color adjusting values;

a first changer for changing the desired first color adjusting value in response to the change instruction; and a second changer for changing the second color adjusting value based on a first change amount of the desired first color adjusting value.

19. A color adjusting method which subjects an image signal of an object photographed by a photographer to a color adjustment based on a plurality of first color adjusting values and at least one second color adjusting value, the plurality of first color adjusting values corresponding to target hue and chroma component values for a plurality of colors, and the at least one second color adjusting value corresponding to target hue and chrominance component values for at least one color different from the plurality of colors, comprising steps of:
- (a) inputting a change instruction of a desired first color adjusting value out of the plurality of first color adjusting values;
- (b) changing the desired first color adjusting value in response to the change instruction; and
- (c) changing the second color adjusting value based on a first change amount of the desired first color adjusting value.

* * * * *